United States Patent
Ye et al.

(10) Patent No.: US 9,253,778 B2
(45) Date of Patent: Feb. 2, 2016

(54) COEXISTENCE MANAGEMENT SERVICE FOR SPECTRUM SHARING

(71) Applicant: INTERDIGITAL PATENT HOLDINGS, INC., Wilmington, DE (US)

(72) Inventors: Chunxuan Ye, Wayne, PA (US); Scott Laughlin, Montreal (CA); Jean-Louis Gauvreau, La Prairie (CA); Zinan Lin, Melville, NY (US); Martino Freda, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 13/887,269

(22) Filed: May 3, 2013

(65) Prior Publication Data

US 2013/0295948 A1 Nov. 7, 2013

Related U.S. Application Data

(60) Provisional application No. 61/642,836, filed on May 4, 2012.

(51) Int. Cl.
*H04W 72/00* (2009.01)
*H04W 72/04* (2009.01)
*H04W 48/10* (2009.01)
*H04W 16/14* (2009.01)

(52) U.S. Cl.
CPC .......... *H04W 72/0453* (2013.01); *H04W 48/10* (2013.01); *H04W 16/14* (2013.01)

(58) Field of Classification Search
CPC ...... H04W 16/14; H04W 72/04; H04W 24/00
USPC ........................ 455/454, 450, 452.1; 370/329
See application file for complete search history.

(56) References Cited

U.S. PATENT DOCUMENTS

| 8,170,048 | B1 | 5/2012 | Gossett et al. | |
| 2004/0077366 | A1 | 4/2004 | Panasik et al. | |
| 2007/0263583 | A1 | 11/2007 | Hyon et al. | |
| 2010/0048234 | A1 | 2/2010 | Singh | |
| 2010/0105400 | A1 | 4/2010 | Palmer | |
| 2012/0014332 | A1* | 1/2012 | Smith et al. | 370/329 |
| 2012/0165059 | A1* | 6/2012 | Schmidt et al. | 455/513 |
| 2012/0207021 | A1* | 8/2012 | Rahman et al. | 370/235 |
| 2012/0264396 | A1* | 10/2012 | Smith et al. | 455/404.1 |
| 2012/0281637 | A1* | 11/2012 | Junell | 370/329 |
| 2013/0183995 | A1* | 7/2013 | Smith et al. | 455/452.2 |
| 2013/0190003 | A1* | 7/2013 | Smith et al. | 455/452.1 |
| 2013/0203435 | A1* | 8/2013 | Smith et al. | 455/454 |

OTHER PUBLICATIONS

IEEE P802.19-11-0151-00-0001, "Wireless Coexistence", Nov. 7-11, 9 pages.
IEEE P802.19-11/49r0, "Wireless Coexistence Working Group", May 2011, 89 pages.
Radio Spectrum Policy Group (RSPG), RSPG11-392 Final, "Radio Spectrum Policy Group 2011: Report on Collective Use of Spectrum (CUS) and other spectrum sharing approaches", Nov. 2011, 38 pages.
IEEE 802.19-10/0104r0, "Channel Selection Support in TVWS", Jul. 2010, 12 pages.
Markus Mueck et al, "Cloud Spectrum Services (CSS) Presentation to ETSI RRS", Feb. 2012, 24 pages.

* cited by examiner

Primary Examiner — Danh Le
(74) Attorney, Agent, or Firm — Condo Roccia Koptiw LLP

(57) ABSTRACT

Systems and methods are provided for coexistence management service for licensed and unlicensed spectrum sharing. A coexistence system may include a coexistence manager (CM) that may provide resource allocation services for a coexistence enabler (CE). CMs may negotiate with each other to resolve coexistence issues via directly or indirectly through a coexistence discovery and information server (CDIS). A channel may be exclusively used by a CE network. The networks may mitigate interference by avoiding use of the same channels. A channel may be shared by multiple CE networks. In co-channel sharing, the networks may mitigate interference via power management. Bidding processes may be implemented directly via competing CMs, for example via open or silent token auction. Bidding processes among competing CMs may be managed by a third party entity, for example a CDIS, for example via open or silent token auction.

20 Claims, 21 Drawing Sheets

COEXISTENCE MANAGEMENT SERVICE FOR SPECTRUM SHARING

CROSS-REFERENCE TO RELATED APPLICATIONS

This application claims priority to U.S. provisional patent application No. 61/642,836, filed May 4, 2012, which is incorporated herein by reference in its entirety.

BACKGROUND

The Federal Communications Commission (FCC) has opened bands of spectrum typically used for television (TV) broadcasts, for use by other devices. Such other devices may use these TV, provided that they are not locally used by one or more primary users of the bands, for example a TV tower, one or more wireless microphones, or the like. In accordance with known FCC regulations, non-primary user devices may operate on these TV bands, for example when one or more pre-defined primary users are not present.

A cellular system may use these TV bands and/or may coexist with one or more other wireless systems in these TV bands. For example, Television White Spaces (TVWS), which may include, for example, unused portions of spectrum allocated for TV broadcasts, may be shared by independent users and/or devices through a regulatory policy and/or a licensing regime.

If multiple devices attempt to access and/or use a common portion of such bands, for example a single channel, concurrently (e.g., substantially simultaneously), the devices may cause interference. Such interference may reduce the overall performance of one or more networks associated with such bands. Known spectrum sharing technology may not efficiently manage network coexistence, neighbor network interference, and/or coordination between devices, for example within a single operator or across multiple operators.

SUMMARY

Systems and methods may be implemented to facilitate coexistence management service for spectrum sharing. Coexistence management systems may be implemented for licensed network spectrum, for example in accordance with licensed shared access (LSA) and/or cloud spectrum sharing (CSS) architectures. An example coexistence system may include a coexistence manager (CM) and a coexistence enabler (CE). The CM may provide resource allocation services for a CE-associated network (CE network).

One or more CMs may negotiate (e.g., resolve coexistence issues) with each other to resolve coexistence issues, for example via direct communication by the CMs with each other. One or more CMs may communicate indirectly with each other to negotiate (e.g., resolve coexistence issues), for example through a coexistence discovery and information server (CDIS). Multiple CMs may compete for access to an available resource, for example an available licensed spectrum resource, using a bidding process (e.g., using tokens). Bidding processes may be implemented directly via competing CMs, for example via open or silent token auction. Bidding processes among competing CMs may be managed by a third party entity, for example a CDIS, for example via open or silent token auction.

A CM may service one or more CE networks. Intra-CM coordination may enable neighbor CE networks registered to the same CM to coexist. A single operator may have specific policies for managing coexistence between devices using the operator's services. A CM may allocate spectrum resources such that such coexistence policies are complied with. Inter-CM coordination may enable neighbor CE networks, for example that are registered to different CMs, to coexist. Operators may have specific policies for managing coexistence between the CE networks that they serve and other CE networks, such as other operator networks and/or standalone networks. A CM may allocate spectrum resources such that such coexistence policies are complied with. A coexistence management system may implement intra-CM coordination, inter-CM coordination, or any combination thereof.

A channel, for example channel of a TV band, may be exclusively used by a CE network. One or more networks may mitigate interference, in accordance with an implementation of exclusive channel use, by avoiding simultaneous use of the same channels. A channel, for example channel of a TV band, may be shared by multiple CE networks, which may be referred to as co-channel sharing. In accordance with an implementation of such co-channel sharing, one or more participating networks may mitigate interference via power management of competing devices, for example.

DETAILED DESCRIPTION

Figure 1A:
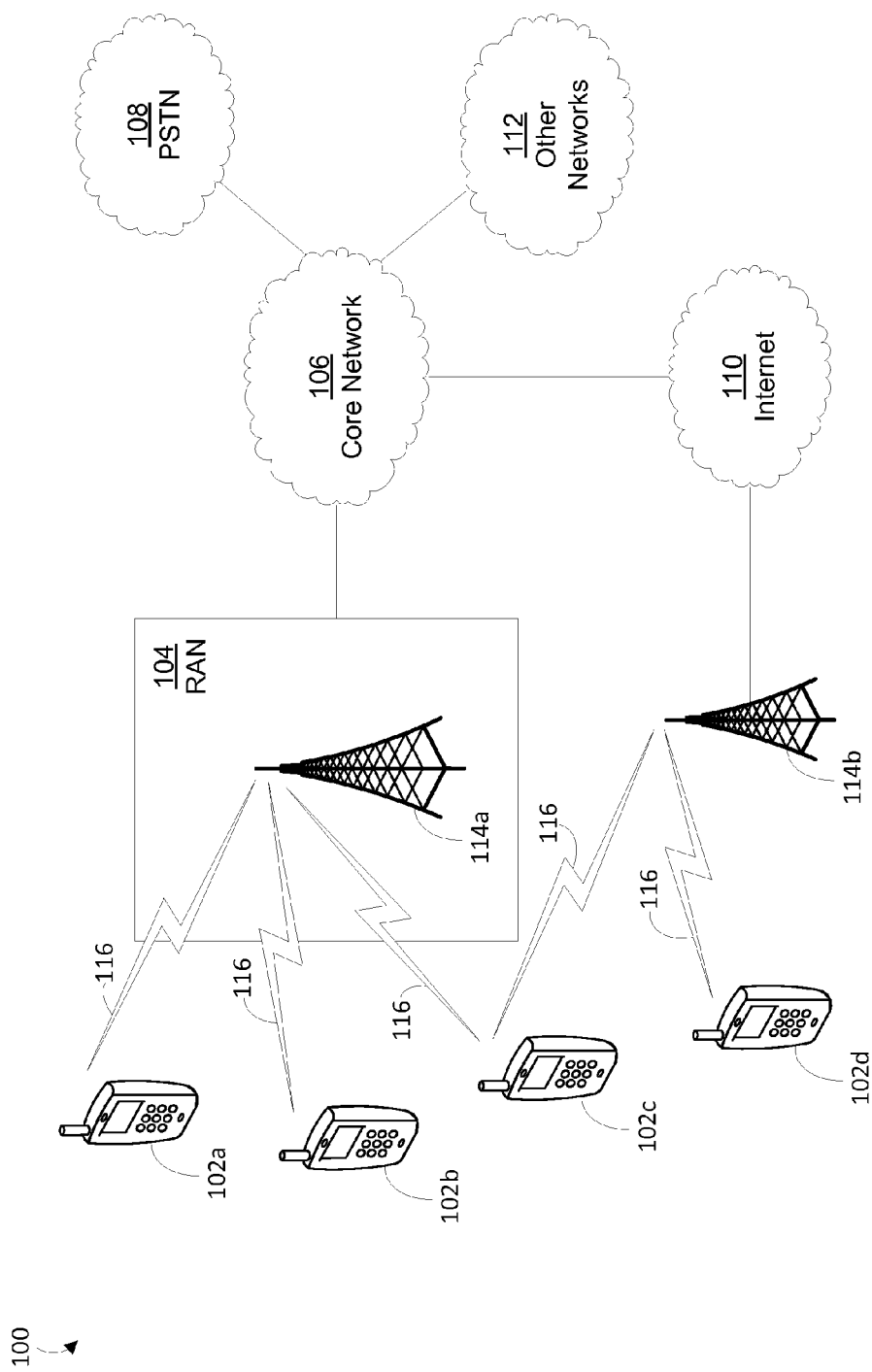
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The core network 106 may include at least one transceiver and at least one processor. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
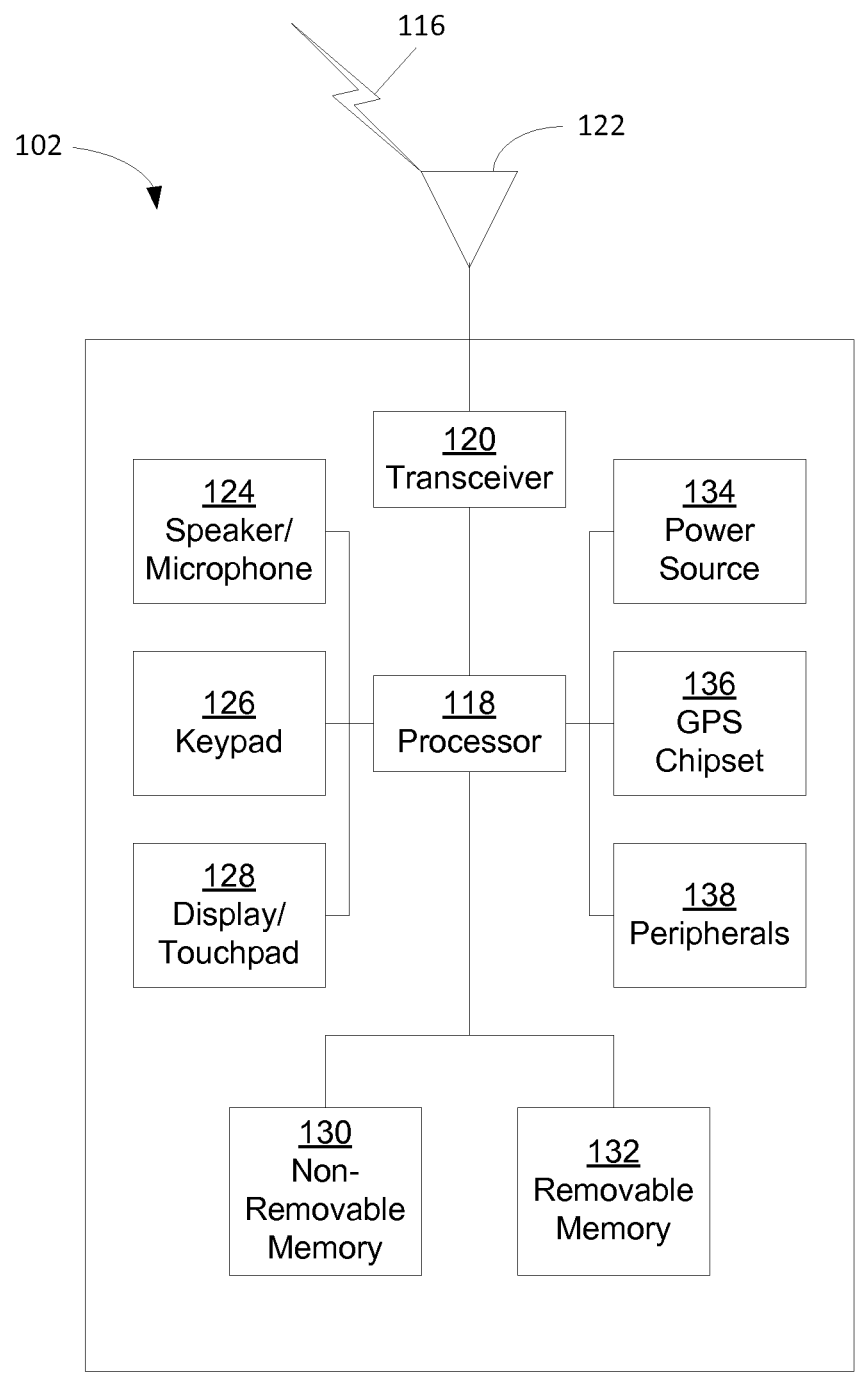
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
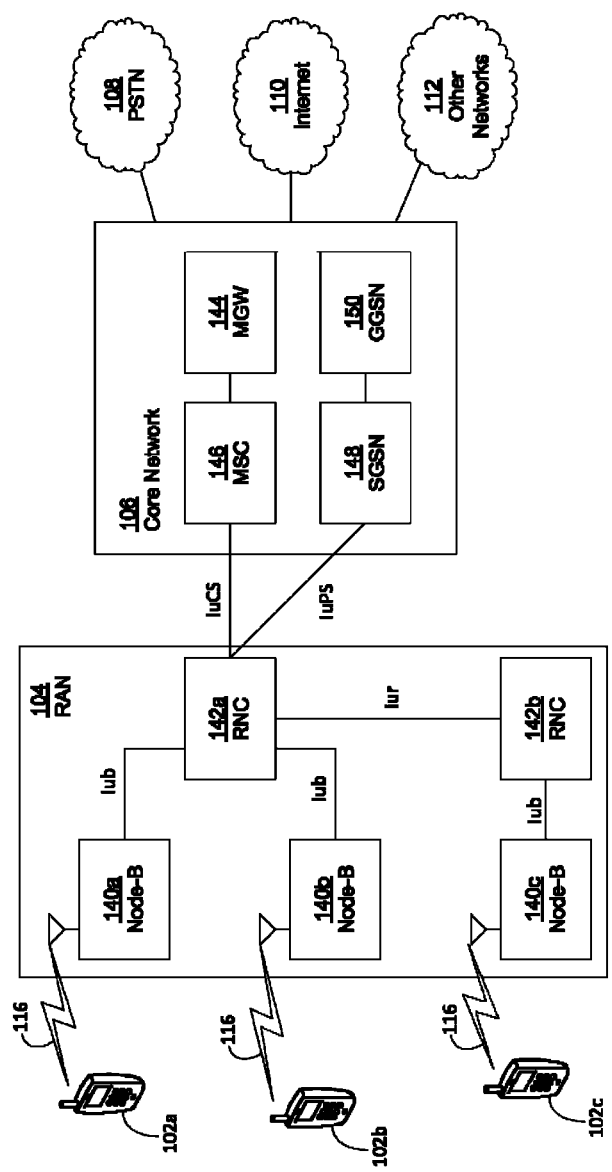
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b and 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
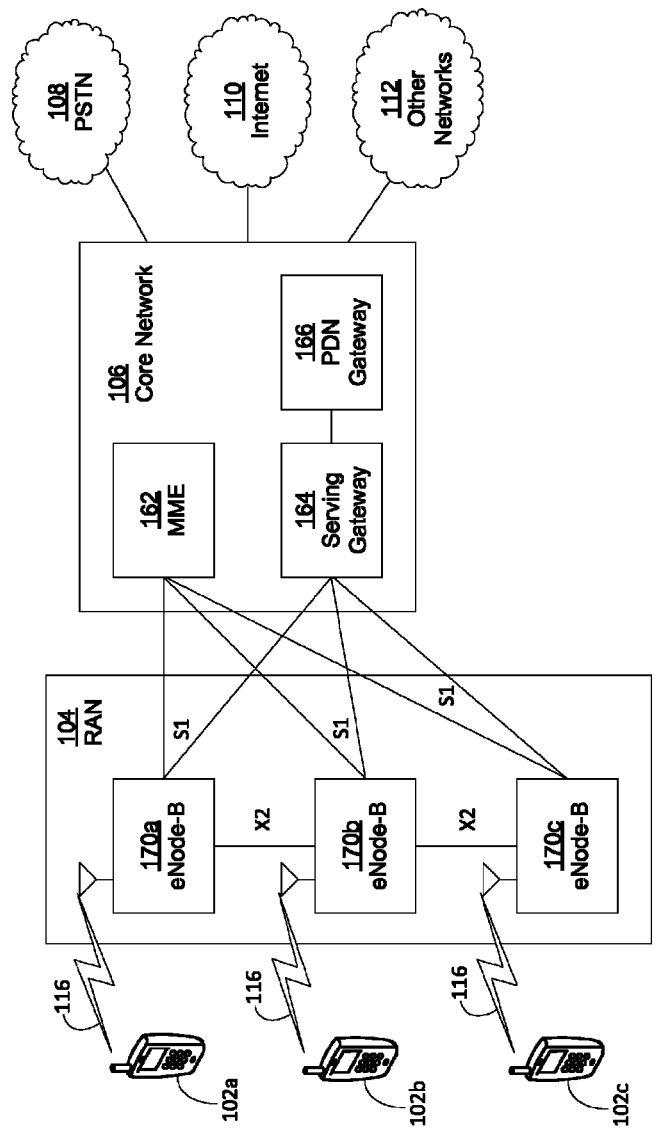
FIG. 1D is a system diagram of an example radio access network and an example core network that may be used within the communications system illustrated in FIG. 1A.

FIG. 1D is a system diagram of the RAN 104 and the core network 106 according to an embodiment. As noted above, the RAN 104 may employ an E-UTRA radio technology to communicate with the WTRUs 102a, 102b and 102c over the air interface 116. The RAN 104 may also be in communication with the core network 106.

The RAN 104 may include eNode-Bs 170a, 170b and 170c, though it will be appreciated that the RAN 104 may include any number of eNode-Bs while remaining consistent with an embodiment. The eNode-Bs 170a, 170b, 170c may each include one or more transceivers for communicating with the WTRUs 102a, 102b, 102c over the air interface 116. In an embodiment, the eNode-Bs 170a, 170b, 170c may implement MIMO technology. Thus, the eNode-B 140a, for example, may use multiple antennas to transmit wireless signals to, and receive wireless signals from, the WTRU 102a.

Each of the eNode-Bs 170a, 170b and 170c may be associated with a particular cell (not shown) and may be configured to handle radio resource management decisions, handover decisions, scheduling of users in the uplink and/or downlink, and the like. As shown in FIG. 1D, the eNode-Bs 170a, 170b, 170c may communicate with one another over an X2 interface.

The core network (CN) 106 shown in FIG. 1D may include a mobility management gateway (MME) 162, a serving gateway 164, and a packet data network (PDN) gateway 166. While each of the foregoing elements are depicted as part of the core network 106, it will be appreciated that any one of these elements may be owned and/or operated by an entity other than the core network operator.

The MME 162 may be connected to each of the eNode-Bs 170a, 170b and 170c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode Bs 170a, 170b, 170c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 1E:
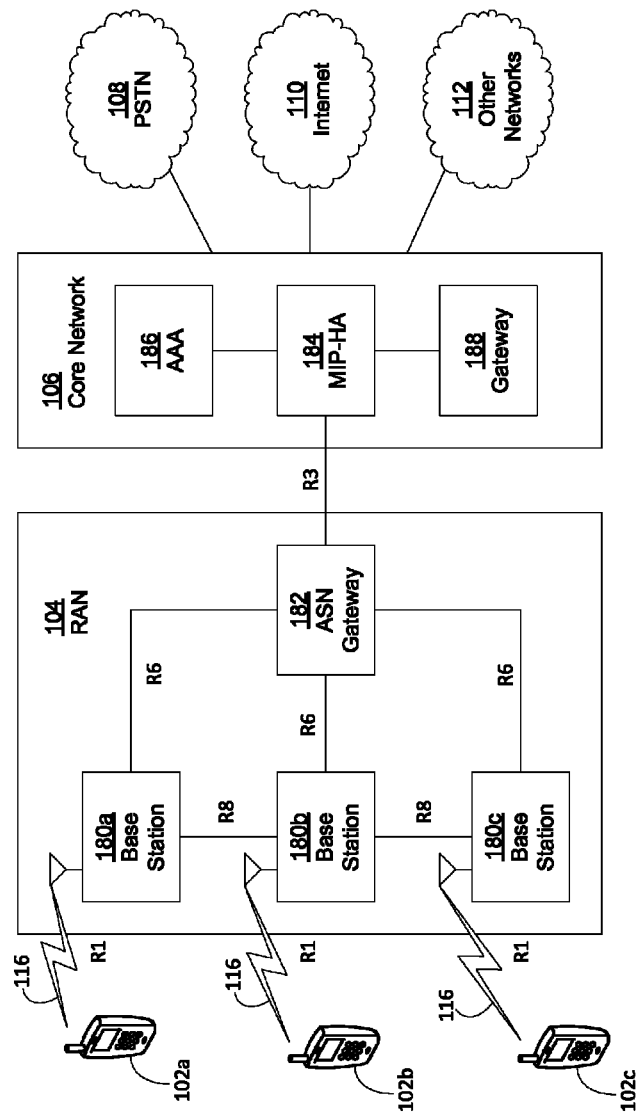
FIG. 1E is a system diagram of an example radio access network and an example core network that may be used within the communications system illustrated in FIG. 1A.

FIG. 1E is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1E, the RAN 104 may include base stations 180a, 180b, 180c, and an ASN gateway 142, though it will be appreciated that the RAN 104 may include any number of base stations and ASN gateways while remaining consistent with an embodiment. The base stations 180a, 180b, 180c may each be associated with a particular cell (not shown) in the RAN 104 and may each include one or more transceivers for communicating with the WTRUs 102a, 102b, 102c over the air interface 116. In one embodiment, the base stations 180a, 180b, 180c may implement MIMO technology. Thus, the base station 140a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 106, and the like. The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 215 may be defined as an R6 reference point. The R6 reference point may include protocols for facilitating mobility management based on mobility events associated with each of the WTRUs 102a, 102b, 100c.

As shown in FIG. 1E, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 184, an authentication, authorization, accounting (AAA) server 186, and a gateway 188. While each of the foregoing elements are depicted as part of the core network 106, it will be appreciated that any one of these elements may be owned and/or operated by an entity other than the core network operator.

Figure 2:
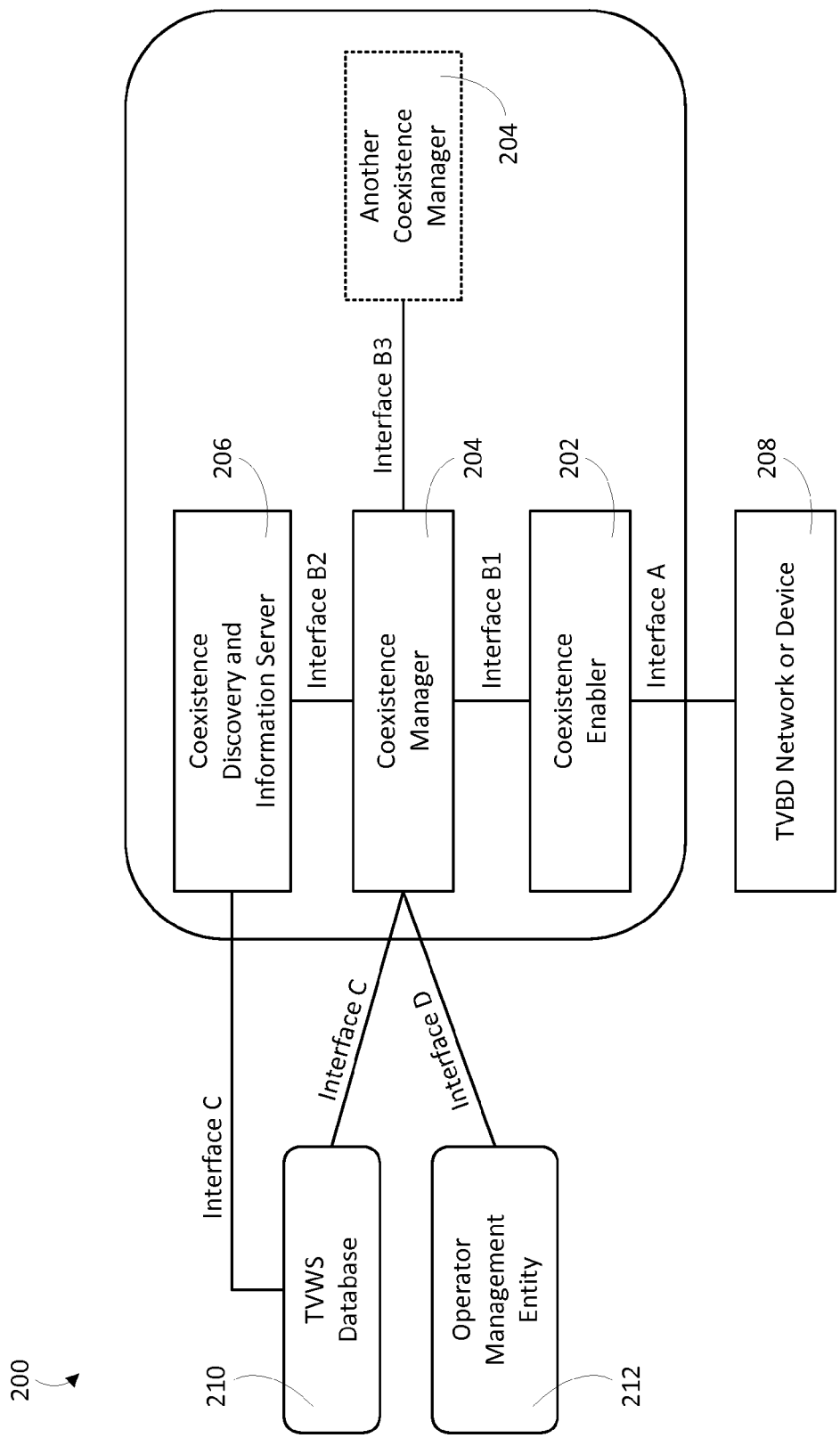
FIG. 2 illustrates an example logical coexistence system architecture.

FIG. 2 illustrates a logical system architecture of an example coexistence system 200 that may be implemented for one or more networks, for example networks operating in television white space (TVWS). The architecture of the coexistence system 200 may include system entities, for example network devices, that may be configured to enable coexistence of one or more TV band networks. As shown, the coexistence system 200 may include one or more logical system entities, for example one or more of a coexistence enabler (CE) 202, one or more coexistence managers (CM) 204, and a coexistence discovery and information server (CDIS) 206.

The architecture of the coexistence system 200 may include one or more external entities, for example network devices, that may be configured to provide information to the coexistence system 200. As shown, the coexistence system 200 may include one or more TV band devices (TVBD) 208 (e.g., TVBD networks), a TV white space (TVWS) database 210, and/or an operator management entity 212.

In accordance with the illustrated coexistence system 200, the CE 202 may request and obtain information from the TVBD, and may send a resource request to the CM 204. The CE 202 may configure one or more operational parameters of the TVBD 208, for example based on a resource allocation from the CM 204. One or more of the CE 202, the CM 204, and the CDIS 206, may be located in a communication network, such as an operator communication network.

The CM 204 may provide spectrum management service to one or more CEs 202, may discover and/or solve coexistence conflicts of one or more TVBD networks 208 operating in the same area, and/or may obtain information from a TVWS database 212 and respective CMs of one or more neighbor networks. The CM 204 may be located at a network operator, for example. The CDIS 206 may provide neighbor discovery service to one or more CMs 204, and may keep records pertaining to one or more registered CMs 204 and/or information associated with one or more TVBD networks 208. For example, a management service or command service may be provided. The CDIS 206 may be located on the Internet, for example.

White space and/or other spectrum may be shared through an implementation of licensed shared access (LSA). LSA, for example, may include a regulatory policy and/or licensing regime whereby a limited number of licensees in a frequency band that may be allocated or owned by a primary incumbent user may use the band (e.g., a portion of the band such as one or more channels) on a non-interfering and/or non-protected basis. In accordance with LSA, one or more additional users or licensees may be allowed to use the spectrum in accordance with sharing rules in the rights of use of the spectrum granted to the licensees, which may allow the licensees to provide a certain level of QoS, for example.

An implementation of LSA may be desirable in contrast to a pure unlicensed or collective use model. For example, an LSA implementation may limit the number of users allocated to use the spectrum, and/or may include comparatively more regulatory control associated with the use of the spectrum. A regulator may know the licensee to operate in a given band, and may effectively handle interference that may arise to the incumbent user. The regulator may manage the spectrum such that each licensee may receive the QoS.

Under an LSA implementation, it may be possible for a system to pool resources that belong to different primary services and/or spectrum owners. For example, multiple cellular operators may be interested in licensing some of their spectrum during periods of low network load and may implement an LSA regime to allow this spectrum to be leased to one or more secondary users and/or licensees. Free (e.g., available) spectrum may be pooled together to create a single set of resources that may be dynamically allocated (e.g., on a short time period) to one or more systems that may request a temporary license to use the spectrum. Such a sharing model, for example, may be referred to as an implementation of cloud spectrum sharing (CSS).

Under an LSA implementation, coordination may be provided, for example, between a primary operator that may have authority over one or more spectrum bands and that may wish to lease or sell temporary usage of one or more bands, and a secondary operator who may lease the band from the primary operator.

With frequency channels available for unlicensed use, a large number of devices may use a channel simultaneously, which may cause interference among one or more devices.

Channel sharing regimes, such as LSA, may implement mechanisms to allow sharing of a channel among multiple devices and/or systems using a temporary license. For example, in accordance with an LSA implementation, a primary user of a band may provide a license to two different systems, based on an assumption that the two systems may still be able to achieve a certain QoS if they share the channel based on one or more coexistence mechanisms.

Figure 3:
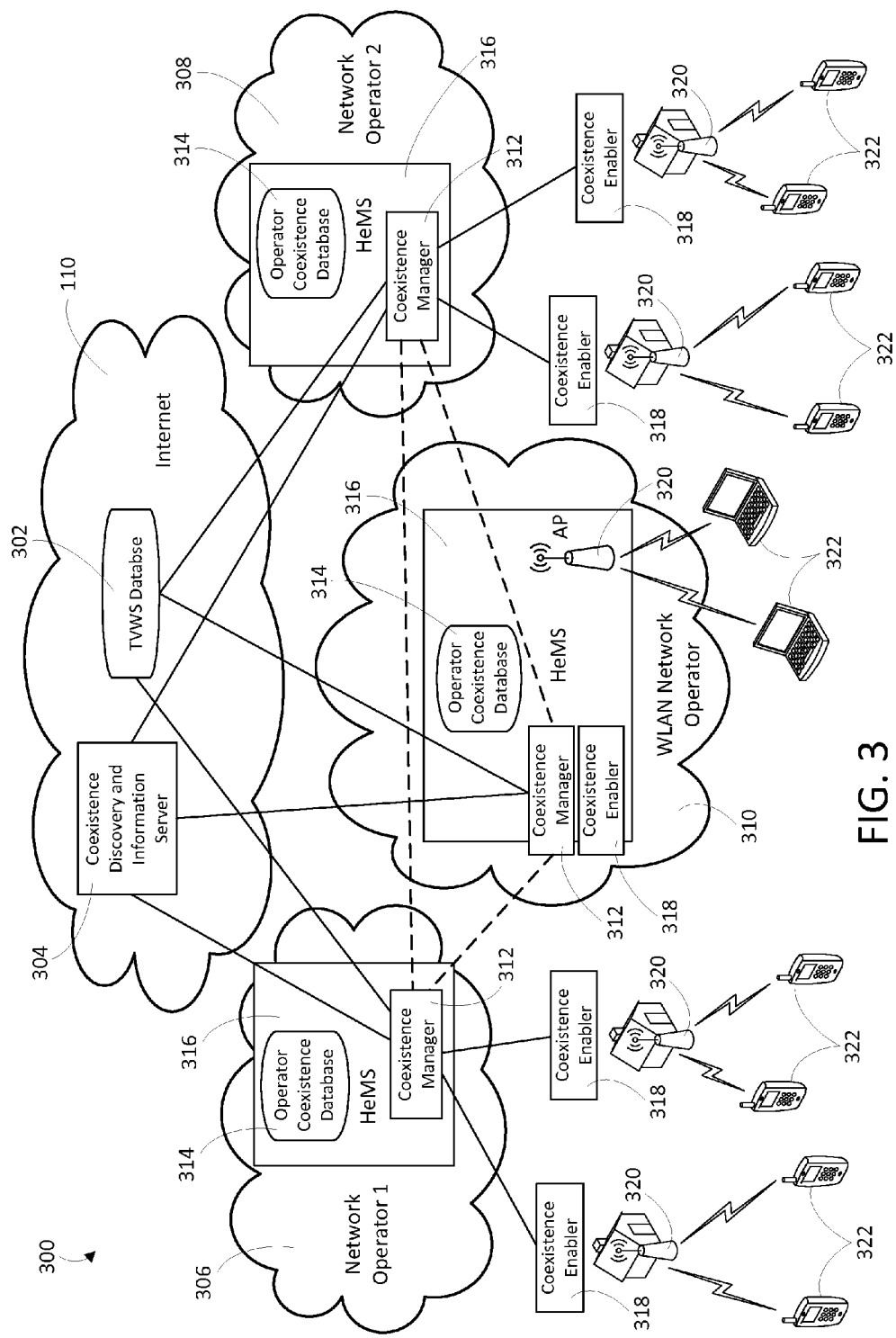
FIG. 3 illustrates an example coexistence management service system.

FIG. 3 illustrates an example network 300 that includes an implementation of an example coexistence management service system. The network 300 may include a TVWS database 302 and a coexistence discovery and information server (CDIS) 304. One or both of the TVWS database 302 and the CDIS 304 may be located on the Internet 110. The network 300 may include a first network 306, a second network 308, and a wireless local area network (WLAN) network 310. The first, second, and WLAN networks 306, 308, 310 may be operated by the same or different network providers. For example, as shown, the first network 306 may be operated by a first network operator and the second network 308 may be operated by a second network operator.

One or more of the first, second, and WLAN networks 306, 308, 310 may include one or more network devices, such as CMs 312 and/or coexistence databases 314 that may reside in respective core networks, for example in respective home eNode B management systems (HeMSs) 316. One or more of the CMs 312 may be associated with one or more corresponding CEs 318. The CEs 318 may be collocated or distributed with respect to the respective home eNode B management systems (HeMSs) 316. A CE 318 may include an access point 320, such as an antenna, that may be communicatively coupled to the CE 318 and that may be configured to enable one or more associated devices 322, to communicate with the CE 318.

One or more of the CEs 318 may be configured to obtain information for coexistence, for example from a TVBD, and may reconfigure TVBD operation in accordance with one or more coexistence decisions. A CE network may include a network capable of co-existing with other networks in TVWS, for example via a CE 318. For example, each CE network, such as a HeNB, may be associated with a CE 318. Respective TVBDs may be connected to one or more CE networks. If the TVBDs are sufficiently close together, the devices may interfere with each other. The interferences may reduce the overall performance of the networks involved.

One or more portions of spectrum, for example unlicensed spectrum, may be allocated so as to reduce interference. A management service based coexistence system may provide a full spectrum solution to CE networks. Usage of one or more TVWS channels may be coordinated within a CE network or among multiple CE networks. A CE network may belong to the same CM 312 or to different CMs 312. The processing of CMs 312 may be enforced. The coordination may include intra-CM coordination and/or inter-CM negotiation.

The coexistence management service system may include one or more CDISs 304. A CDISs 304 may be in operative communication with the other system components such as the CMs 312, for example via the Internet 110. A CDIS 304 may store information pertaining to one or more CE networks. Such information may be used for facilitating neighbor discovery between CMs 312, for example. The CE network information may include network identification information such as a network ID, a network type, and may include network operator information, network operation information such as geo-location and coverage area of the CE network, a network device's Tx power class and/or Tx antenna height, the radio access technologies, or the like. The CDIS 304 may store TVWS usage information pertaining to one or more secondary networks.

The TVWS usage information of one or more secondary networks may be stored in one or more of the operator coexistence databases 314, for example. An operator coexistence database 314 may reside within the same node as a corresponding CM 312. An entry in the operator coexistence database 314 may correspond to a CE 318 entity or an access point (AP) 320 operating on respective TVWS bands. An entry may include one or more of network identification information, TVWS usage information network operation information, and/or negotiation-related information, for example.

Network identification information may include one or more of a network ID that may uniquely identify a CE network, information indicating network type, identification address of the CE network, and/or CE geo-location information, for example.

TVWS usage information may include one or more of information indicating a TVWS channel(s) occupied by the network, a duration or the time period of the TVWS channels usage, CE antenna height and/or the height of the transmission antenna, and/or CE transmission power or the power level of the transmission antenna, for example.

Network operation information may include one or more of information indicating a network coverage area, interference area related information, network device information, a network QoS requirement, radio access technologies (e.g., WiFi, LTE-TDD, LTE-FDD, etc.), and/or network policy information.

Interference area related information may include one or more of interfering neighbor network information, such as a physical cell ID for an LTE network or an SSID for a WIFI network, and/or an inter-dependency mapping such as the interference level between two networks, for example. The inter-dependency mapping information may depend on, for example, the geo-locations of the networks, and/or one or more other radio environment measurements.

Network device information may include one or more of network device IDs, working spectrum, location, radio frequency sensitivity, sensing capability, and/or transmission power of the network devices, for example. The network policy information may indicate one or more policies that the CE network may follow. An example policy may include not using channels adjacent to an occupied TV channel, due to the short distance to a TV tower or policies on co-channel sharing.

A CM 312 may maintain a database of coexistence information. For example, a CM 312 may populate and/or maintain a corresponding operator coexistence database 314. The database 314 may be kept locally at the CM 312, or remotely. The CM 312 may update information associated with the networks within the operator in the CDIS 304 and TVWS database 302. The CM 312 may allocate TVWS resources to one or more associated CE networks within the operator, may coordinate TVWS usage between multiple CE networks within the operator, and/or may negotiate TVWS usage between multiple CE networks (e.g. between CMs 312 from different operators).

A CE 318 may provide information and/or resource to the CM 312. The CE 318 may forward spectrum usage information from an associated CM 312 to one or more devices in a CE-associated network that corresponds to the CE 318 (e.g., a CE network) and may forward processed spectrum information back to the CM 312. The CE 318 may receive one or more resource allocation decisions from the CM 312, and may configure operation of one or more associated CEs 318, for example based on the resource allocation.

Figure 4:
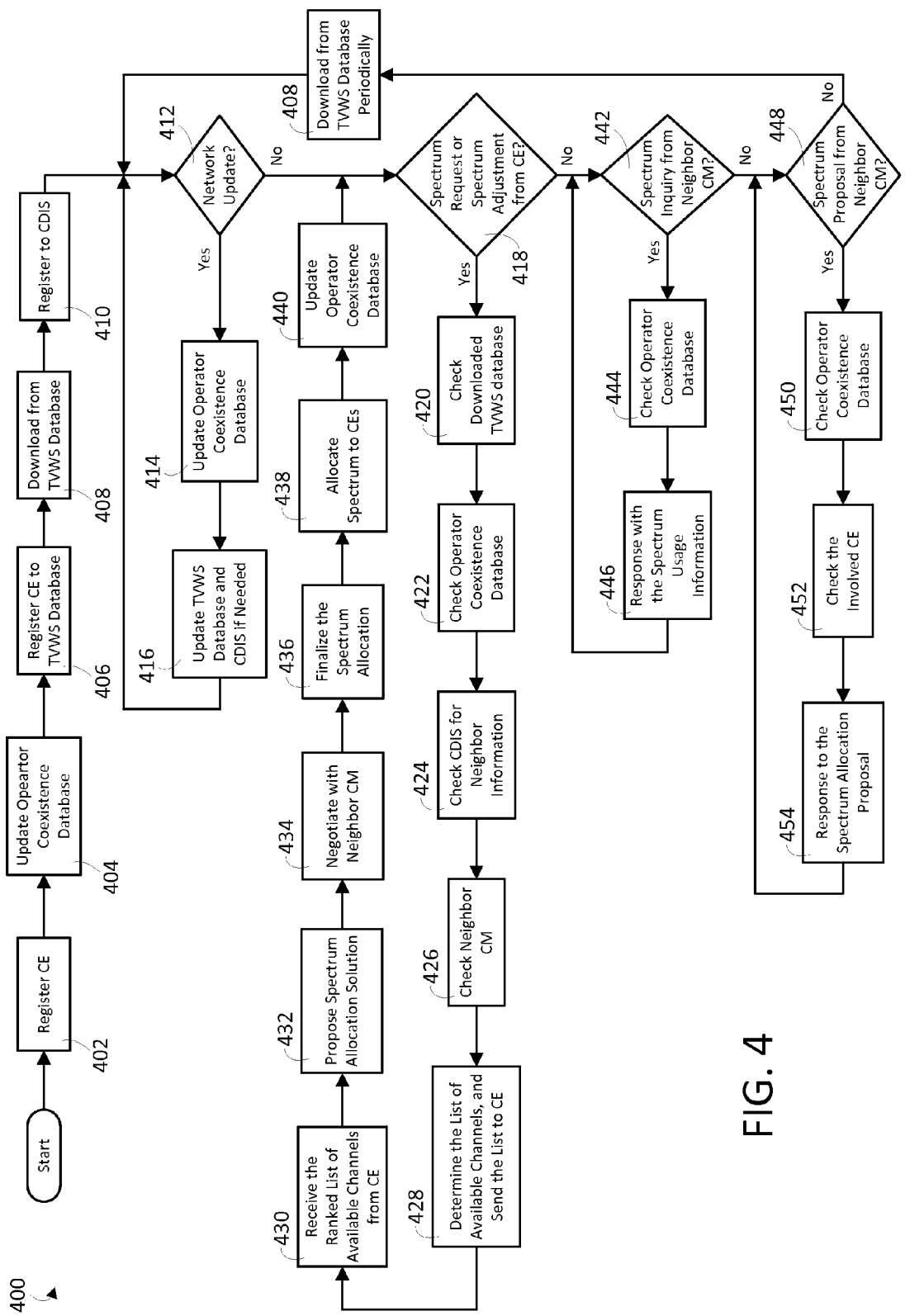
FIG. 4 illustrates an example coexistence manager (CM) management service procedure.

FIG. 4 illustrates an example coexistence manager (CM) management service procedure 400. As shown, at 402 a CE may send a registration request to an associated CM. As part of registration, the CM may collect information pertaining to a corresponding CE network, that may include one or more of a network ID, network administrator contact information, information pertaining to one or more TVBDs within the CE (e.g., device ID, device type, device serial number, location, transmission antenna height), for example. At 404, the CM may store or update an associated operator coexistence database, for example based on the collected CE network information.

At 406, the CM may register the CE to the TVWS database. For example, the CM may register the CE as a fixed or Mode II TVBD (e.g., a HeNB). The CM may provide TVBD information to the TVWS database, which may include one or more of a CE device ID, a device type, a serial number, a device location, and/or contact information, etc., for example.

After the registration process is completed, the CM may acquire, for example from the TVWS database at 408, TVWS usage information related to primary users within one or more coverage areas of one or more activated CE networks (e.g., CE networks associated with an LTE core network). The TVWS database information download 408 may occur periodically, for example every day. The download frequency may be specified in a policy, for example in accordance with FCC rules.

At 410, the CM may register the CE networks to the CDIS and/or may provide CE network information to the CDIS, which may include one or more of a network location, a network coverage area, network operator contact information, etc., for example.

At 412, the CM may receive a CE network update. At 414 and 416, respectively, the operator coexistence database, the TVWS database, and/or the CDIS may be updated. For example, when the location of a Mode II TVBD device (e.g., HeNB) changes, the CM may update the TVWS database and the CDIS. The network update may include the release of certain TVWS channel resources by a CE network, for example.

At 418, the CM may receive a spectrum request or a spectrum adjustment, for example from an associated CE network. The spectrum request may be received via an associated CE, for example.

At 420 and 422, respectively, the CM may, depending on the CE network location, check the downloaded TVWS database and the operator coexistence database for one or more available channels in the location. The CM may request that one or more associated CEs check the radio environment in proximity to the requesting CE network.

At 424, the CM may check the CDIS for contact information of one or more networks near the requesting CE network. In a case where there are one or more neighbor networks, the CM may check the neighbor networks for TVWS channel usage information (e.g., current usage information). At 426, for example, the CM may inquire of one or more neighbor networks via associated CMs.

At 428, the CM may collect the information and may derive a list of candidate channels. The CM may send this list of candidate channels to the CE. The CE may rank the candidates based, for example, on the local radio environment and may send the ranking of the available channels to the CM, at 430. Based on the ranking, the CM may, at 432, make a spectrum allocation proposal for the requesting CE network.

At 434, the CM may negotiate the proposal with a neighbor CM. Such negotiation may occur for more than one round. For exclusive channel allocations, for example, a negotiation process may be omitted (e.g., waived).

At 436, one or more neighboring CMs may finalize the spectrum allocation. At 438, the CM may transmit the spectrum allocation decision to the requesting CE network. At 440, the CM may update the operator coexistence database to reflect the allocation. The final spectrum allocation may affect the channel resource usage among several CEs within the same operator. For example, the CM may sacrifice part of the TVWS channel resources of one CE for another CE within the same operator. The negotiation and spectrum allocation may be based, for example, on one or more decision-making and/or negotiation algorithms, and/or on one or more policies.

At 442, the CM may receive a spectrum inquiry from a neighbor CM. At 444, the CM may check the operator coexistence database, for example in order to determine whether the operator has, at a specific location, networks operating on the TVWS channels of interest. At 446, the CM may respond to the inquiring CM with spectrum usage information.

At 448, the CM may receive a spectrum proposal from, for example, a neighbor CM. At 450 and/or at 452, the CM may determine whether the spectrum proposal conflicts with current spectrum usage based, for example, on queries to the operator coexistence database and/or to one or more associated CEs, respectively. Based on the determination, the CM may, at 454, respond to the spectrum proposal.

It should be appreciated that the illustrated operations of the example CM management service procedure 400 need not be illustrated in numerical order, and that less than all of the operations may be executed. For example, the example CM management service procedure 400 may include the execution of one or more of 402 to 410, 412 to 416, 418 to 440, 442 to 446, 448 to 454, and 408, for example.

Figure 5:
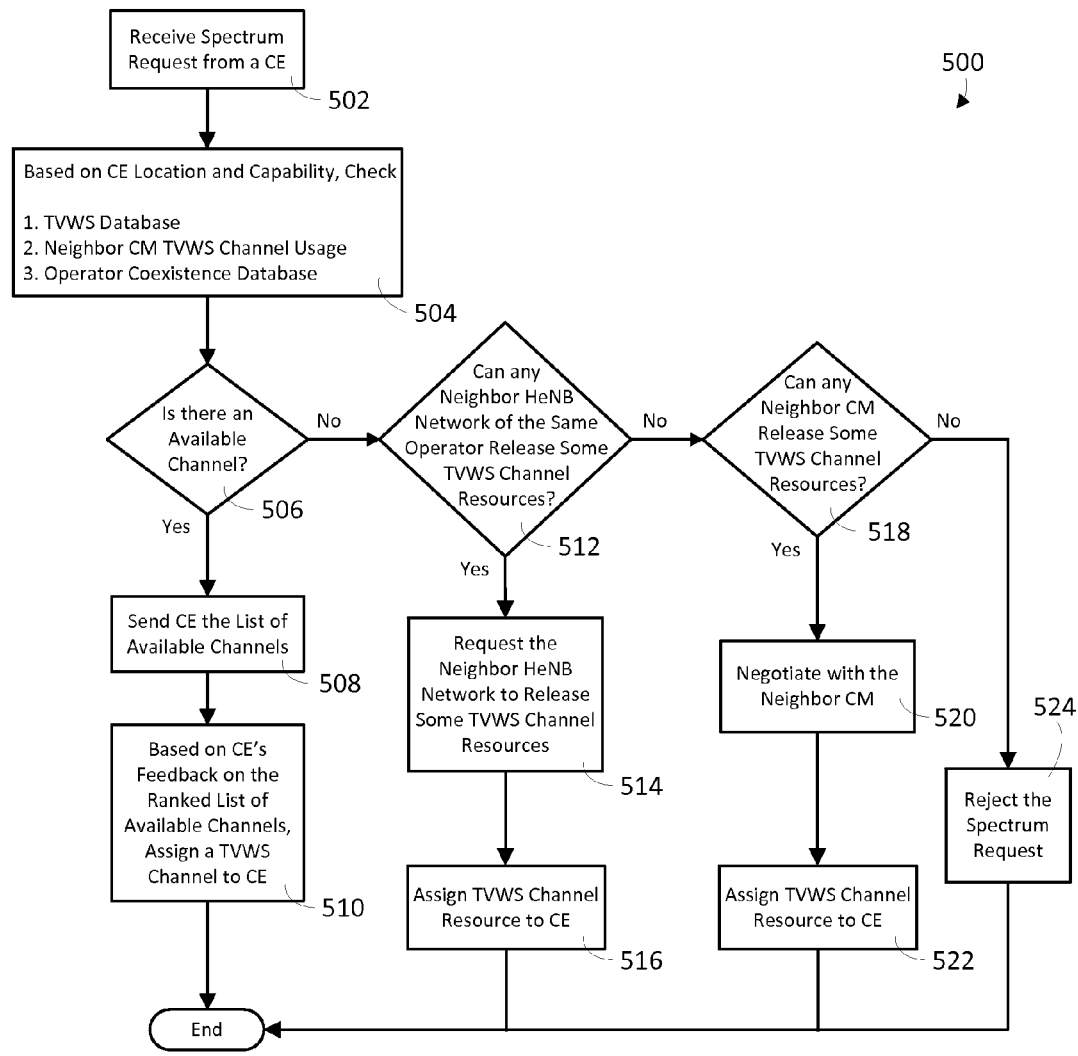
FIG. 5 illustrates an example CM channel allocation procedure in accordance with exclusive channel use.

FIG. 5 illustrates an example CM channel allocation procedure 500 in accordance with exclusive channel use. At 502, the CM may receive a spectrum request, for example from an associated CE. At 504, the CM may, depending on a network location and/or capability of the requesting CE, check one or more of a downloaded database (e.g., a TVWS database), channel usage (e.g., TVWS channel usage) of one or more neighbor CMs, and an operator coexistence database, for one or more available channels in that location.

At 506, the CM may determine whether a channel is available. If there are one or more an available channels, the CM may, at 508, send a list of the one or more available channels to the requesting CE. At 510, the CM may, based on feedback received from the requesting CE that pertains to the ranked list of available channels on, assign an available channel resource (e.g., an available TVWS channel) to the requesting CE.

At 512, if the CM determines that there is no available channel, the CM may determine whether a neighbor CE network (e.g., a neighbor HeNB) of the same operator may release one or more channel resources (e.g., TVWS channel resources). If a neighbor CE network of the same operator may release one or more channel resources, the CM may request that the neighbor CE network to release the channel resource at 514, and may assign the channel resources to the requesting CE at 516.

If the CM determines that no neighbor CE network of the same operator may release one or more channel resources, the CM may, at 518, determine whether a neighbor CM may release one or more channel resources (e.g., TVWS channel resources). If a neighbor CM may release one or more channel resources, the CM may negotiate with the neighbor CM for the channel resources at 520, and may assign the channel resources to the requesting CE at 522.

If the CM determines that there is no available channel, that no neighbor CE network of the same operator may release one or more channel resources, and/or that no neighbor CM may release one or more channel resources, the CM may, at 524, reject the spectrum request.

It should be appreciated that the illustrated operations of the example CM channel allocation procedure 500 need not be illustrated in numerical order, and that less than all of the operations may be executed.

A CM may coordinate channel allocation (e.g., TVWS channel allocation) among one or more neighbor CE networks that are associated with the same CM. Such coordination may be referred to as intra-CM coordination and may be centralized. For example, there may be one CM per network operator, and intra-CM coordination may apply to inter-operator coordination. Depending on policies and/or network capabilities, for example, the TVWS channel allocation may be categorized into classes, for instance exclusive channel usage and co-channel sharing.

In exclusive channel usage, a TVWS channel may be used by a single CE network within a location. Exclusive channel usage may be applied, for example when a number of available TVWS channels is larger than a number of requesting CE networks. In co-channel sharing, a TVWS channel may be shared by multiple neighboring CE networks. Co-channel sharing may be applied, for example, when a number of available TVWS channels is limited (e.g., smaller than a number of requesting CE networks).

If a network exhibits limited capabilities, an available channel (e.g., a TVWS channel) may be used by a single CE network in a specific location. When a CM receives a spectrum request from a CE, the CM may determine whether there is an available channel. Based on a determination that there is an available channel, the CM may assign that channel to the requesting CE. If the CM determines that there is no available channel, the CM may, for example, check the coexistence database to see if any of its serving CE networks, such as the neighboring networks of the requesting CE network, may release a channel for the requesting CE network.

The CM may determine whether to release a channel based on the priority of the requesting CE network and/or the priority of the occupying network, for example. A CE network having a higher (e.g., highest) priority may operate on the TVWS channel. The priority value for a give CE network may be determined based on one or more factors that may include, for example, a network QoS requirement. For example, a network with a high QoS requirement may be associated with a higher priority value. The factors may include a number of TVBDs in the network. A network with more TVBDs may indicate a high traffic demand and may be associated with a higher priority value. The factors may include a subscribed service level such that the CE subscribing the high service level may be associated with a higher priority value. The factors may include a number of tokens such that the network with more tokens or that is willing to pay more tokens for the channel may be associated with a higher priority value. Tokens may be acquired from a third party or from the core network itself, for example. In an example implementation, tokens may be purchased at a predetermined price.

Based on the priority levels of its conflicting CE networks, the CM may determine the CE network that may use the available channel. The CE may inform the respective CE for a corresponding channel switch operation.

A CM may be configured to perform one or more optimization operations, such as facilitating channel exchange. For example, a CM may instruct two CE networks to exchange and/or swap respective channels that they operate on, such that the networks may occupy adjacent channels. To illustrate, a CE network may occupy TVWS channels 21 and 23, while a neighbor CE network may occupy TVWS channels 22 and 24. An associated CM may instruct the two networks to exchange TVWS channels 22 and 23 such that one CE network occupies channels 21 and 22, and the other CE network occupies channels 23 and 24. Such channel exchange operations may optimize network operation, for example by taking advantage of a guard spectrum.

When a number of requesting neighbor CE networks of an operator is larger than the number of available channels at that location, one or more of the CE networks may share one or more channels. In accordance with a centralized coexistence mechanism, the co-channel sharing decision and/or spectrum allocation proposal shown in FIG. 4 may be made by the CM.

Co-channel sharing may, for example, be in the form of time division multiplexing (TDM), in the form of frequency division multiplexing (FDM), and/or or in the form of interference management. In accordance with FDM co-channel sharing, one or more TVWS channels may be partitioned into sub-channels. One or more CE networks may each occupy one or more some sub-channels, for example. In accordance with interference management co-channel sharing, the transmission power of each co-channel sharing CE network may be limited such that an interference level to one or more neighbor CE networks may be below a predetermined threshold.

FDM-based co-channel may be performed in accordance with various implementations. To illustrate, m CE networks may share one or more common channels (e.g., TVWS channels). The channels may be partitioned into n sub-channels. Though the number of common channels may be less than the number m of CE networks, the number n of sub-channels may be larger than m. The $i^{th}$ sub-channel may be denoted as $SC_i$ and the set of sub-channels allocated to the $i^{th}$ CE network may be denoted as A. The sub-channel sets $A_1, \ldots, A_m$, may not overlap, or $A_1 \cup A_2 \ldots \cup A_m = \{SC_i, \ldots, SC_n\}$. In an example, sub-channel bandwidth may be chosen to be 1.4 MHz or 3 MHz.

In accordance with an example, let $C_i$ ($A_i$) denote the capacity (or throughput) that the $i^{th}$ CE network may achieve by using the allocated sub-channels in A. The capacity may equal to log(1+SINR), where SINR may be calculated based on a TVBD transmission power and/or an interference-noise power. The transmission power of the CE network may be provided from the CE to the CM. The interference-noise power may be measured as radio environment by the CE, for example.

One or more channels may be allocated such that the sum-capacity of the CE networks may be as large as possible (e.g., maximized). Such a channel allocation may be expressed as $$\max_{\{A_1,\ldots,A_m\}} \sum_{i=1}^{m} C_i(A_i)$$

One or more traffic conditions of the CE networks may be considered in channel allocation. For example, it may be assumed that $L_i$ represents the required supporting data rate of the $i^{th}$ CE network. A required supporting data rate may include the difference of the actual traffic load and the data rate that may be supported, for example by the normal LTE band. An actual traffic load may be calculated as a function of a number of TVBD devices in the CE network, and/or the applications run by the TVBD devices. Such a channel allocation may be expressed as $$\min_{\{A_1,\ldots,A_m\}} \sum_{i=1}^{m} \max\{0, L_i - C_i(A_i)\}$$

The channel allocations as described herein may be applied to TDM-based co-channel sharing. In accordance with TDM-based co-channel sharing, a unit measure of time slot may be in radio frames (e.g., 10 ms) or sub-frames (e.g., 1 ms). A first CE network may use a first (e.g., current) radio frame or sub-frame, while a second CE network may use a second (e.g., next) radio frame or sub-frame. The CEs of the first and second sharing CE networks may be synchronized. Synchronization between the CEs may be coordinated by the CM, for example. A synchronization operation may take place periodically. A synchronization frequency may depend on clock shift conditions associated with the CEs. The first and second neighboring CEs may set guard times such that the interference caused by inaccurate synchronization may be reduced or avoided.

When multiple CE networks share a channel, interference among the CE networks may be managed. To illustrate, denote a transmission power of the $i^{th}$ CE network as $T_i$, and denote an interference level that the $i^{th}$ CE network may tolerate as $Thre_i$. Individual transmission power may be in accordance with one or more regulations (e.g., an FCC rule). Based on the respective transmission powers of the CE networks and/or relative distances between the CE networks, an average interference $R_i$ at the $i^{th}$ CE network, for example that is received from its neighbor CE networks, may be calculated. The average interference may be calculated as a function of $(T_j, d_{i,j}, j \neq i)$, where $d_{i,j}$ may denote a distance between the $i^{th}$ CE network and the $j^{th}$ CE network.

Power may be allocated such that the sum-capacity of the CE networks may be as large as possible (e.g., maximized). Such power allocation may be expressed as $$\max_{\substack{\{T_1,\ldots,T_m\}:s.t.\\ R_i(T_1,\ldots,T_m)<Thre_i}} \sum_{i=1}^{m} C_i(T_i)$$

The parameter $T_i$ may contribute to the capacity formula, in terms of SINR.

Power may be allocated based on a network requirement. For example, such power allocation may be expressed as $$\min_{\substack{\{T_1,\ldots,T_m\}:s.t.\\ R_i(T_1,\ldots,T_m)<Thre_i}} \sum_{i=1}^{m} \max\{0, L_i - C_i(T_i)\}$$

One or more of information pertaining to a transmission power, a required supporting data rate of a CE network, and/or a distance between two CE networks, may be stored, for example in a coexistence database of an operator. Information pertaining to an interference-noise power and/or a tolerant interference level threshold may be transmitted from CE to CM, for example upon request.

A CM may select a co-channel sharing implementation based on a network capability. For example, a CM may select a sharing implementation that is supported by one or more associated CE networks. Respective complexities of one or more co-channel sharing implementations may be weighed during selection of a co-channel sharing implementation. For example, a TDM-based co-channel sharing implementation may be more complex than one or more other co-channel sharing implementations, as it may involve synchronization signals between networks. Respective performance degradations that may result from one or more co-channel sharing implementations may be considered during selection of a co-channel sharing implementation.

Multiple CMs may negotiate channel usage. For example, a first CM may receive a spectrum request from an associated CE that may impact a second neighbor CM. The first CM may initiate a negotiation procedure with the second CM. The first CM may be associated with a first operator and the second CM may be associated with a second operator. Such negotiation may be referred to as inter-operator negotiation. The negotiation may effectively be between the first and second network operators.

Upon negotiation, one network may fully occupy the channel, while one or more other networks may evacuate the channel. The network that exclusively occupies the channel may be determined based on one or more rules (e.g., rules that may be established by a regulator or a standards body).

Individual channel assignment may be allocated in accordance with a first come first served rule. For example, a network that first occupies a channel (e.g., a TVWS channel) may win a contention for the channel. A maximum allocation duration and/or a number of channels that a CE network may use at the same time may follow one or more policies and/or rules (e.g., rules that may be established by a regulator or a standards body).

Individual channel assignment may be based on network requirements. For example, a network that supports a highest number of TVBD devices, compared to one or more other networks, may occupy the channel. In another example, a network with a highest QoS requirement, compared to one or more other networks, may occupy the channel.

Individual channel assignment may be token based. For example, it may be assumed that each one of multiple network possess a number of tokens. The tokens may be acquired from a third party, for example. An amount of tokens received may depend on network situations, for example. A network that occupies a channel (e.g., a TVWS channel) may evacuate the channel for another network in exchange for one or more tokens.

Individual channel assignment may be based on historical usage of one or more channels (e.g., a TVWS channel). The history of channel usage may be exchanged between one or more CMs (e.g., neighboring CMs) during a negotiation process. If the historical data indicates that an inquiring CM uses a channel more often than does one or more other CMs, a CM that presently occupies the TVW channel may remain on the channel. If the historical data indicates the inquiring CM uses the channel less often than does a second CM that presently occupies the channel, then the inquiring CM may occupy the channel.

Individual channel assignment may be based on a bidding process. For example, a highest bidder may be assigned access to a channel. For example, a first operator may offer a first bid of up to a certain dollar amount Y for access to a channel. A second operator may offer a second bid of up to an inferior dollar amount Z for access to the channel. Each bid may be increased by an amount X, for example. The auction may be settled by a bid of Z+X, for example.

A channel assignment decision may take effect immediately, or substantially immediately, after the negotiation, or may take effect upon expiration of a predetermined delay period.

Negotiation messages exchanged between the CMs may have different content in accordance with different implementations. For example, negation messages may include information indicating respective numbers of TVBDs in the networks, respective QoS requirements of the networks, and/or respective numbers of tokens transferred, etc.

Upon negotiation, more than one network may share a common channel, for example in accordance with a co-channel sharing implementation. Co-channel sharing may be implemented in accordance with TDM, FDM, and/or interference management. A CM may select a co-channel sharing implementation based on one or more of feasibility, complexity and performance of the implementation. In accordance time division based sharing, one or more networks associated with the CMs may occupy a channel (e.g., a TVWS channel) during different time slots. In accordance with frequency division based sharing, one or more networks associated with the CMs may occupy different sub-channels of a channel (e.g., a TVWS channel). Advanced frequency sharing (e.g., fractional frequency reuse) may be implemented. For interference management based sharing, one or more neighboring networks may restrict corresponding transmission powers such that co-channel interference between them may be below a threshold level. The interference threshold level may be determined in accordance with a rule (e.g., a regulatory rule), may be RAT-dependent, etc.

FDM-based co-channel sharing may be implemented. For example, a first CE network may negotiate with a second CE network for channel resources that the second CE network currently occupies. The channel resources that the second CE network occupies may include sub-channels $\{SC_1, \ldots, SC_n\}$. To illustrate, let $A_1$ denote the sub-channels that the first CE network hopes to obtain. Let $C_1(A_1)$ denote a first capacity or throughput that first CE network may achieve by using the sub-channels in $A_1$. Let $C_2(\overline{A_1})$ denote a second capacity or throughput that the second CE network may retain by sacrificing the sub-channels in $A_1$. It may be assumed that $L_i$, i=1, 2, may be a supporting data rate of CE network i.

If, for example, the first CE network has loose cost constraints, the first CE network may propose to obtain sub-channels $A_1$ such that the first CE network may achieve a largest data rate while keeping the second CE network above a specified (e.g., required) data rate of the second CE network. Such co-channel sharing may be expressed as $$\underset{A_1:, C_2(\overline{A_1}) \succ L_2}{\operatorname{argmax}} \quad C_1(A_1)$$

A cost of obtaining each sub-channel may be the same or substantially the same. For example, a number of tokens it may take for obtaining each sub-channel may be the same or substantially the same. In such an example, the first CE network may identify a set of sub-channels such that both the first and second CE networks may achieve respective specified (e.g., required) data rates, and such that the first CE network may pay the least cost. Such co-channel sharing may be expressed as $$\underset{A_1: C_1(A_1) \succ L_1, C_2(\overline{A_1}) \succ L_2}{\operatorname{argmax}} \quad |A_1|$$

Interference management-based co-channel sharing may be implemented. To illustrate, let $T_1$ and $T_2$ denote respective proposed transmission powers of the first and second CE networks. Let $C_i(T_1, T_2)$ denote a capacity or throughput that a CE network i may achieve under a given power level. If the first CE network has loose cost constraints, the first CE network may propose to obtain a largest allowed transmission power while keeping the second CE network above a specified (e.g., required) data rate. Such co-channel sharing scheme may be expressed as $$\underset{T_1, T_2: C_2(T_1, T_2) \succ L_2}{\operatorname{argmax}} \quad T_1$$

A cost of obtaining one or more sub-channels may be the same or substantially the same. For example, a number of tokens it may take for obtaining one or more sub-channels may be the same or substantially the same. The first CE network may identify a transmission power such that both the first and second CE networks may achieve respective specified (e.g., required) rates, and such that the first CE network pays the least cost. Such co-channel sharing may be expressed as $$\underset{T_1, T_2: C_1(T_1, T_2) \succ L_1, C_2(T_1, T_2) \succ L_2}{\operatorname{argmax}} \quad T_2$$

A CE may include a coexistence interface with a CM such that one or more TVBD networks may benefit from the coexistence management service. The CE may register with a CM. The CM may register the CE in a TVWS database on behalf of the CE, for example to comply with one or more regulations (e.g., FCC regulations). Upon registration, the CM may receive coexistence information from the TVBD. For example, the CM may receive information indicating network capabilities, resource needs and/or radio environment, etc. The CE may process the information and/or may deliver a subset to an associated serving CM.

The CE may inform the CM of a network update. A network update may include one or more TVBD devices entering the network, one or more TVBD devices exiting the network, changes of one or more properties of the network such as a location change or a transmit power change of the CE, a network QoS requirement change, one or more changes on the network radio environment, and/or the network vacating one or more channels (e.g., one or more TVWS channels).

The CE may send a spectrum request and/or a spectrum adjustment message to the CM. For example, the CE may receive a TVWS service request from one or more associated TVBD devices. The spectrum request from the CE may be triggered by various factors. The triggering factors may be initiated by CE itself, and/or by one or more TVBD devices. Example CE initiated factors may include, a detection of network degradation such as congestion or high retransmission, an increased buffer occupancy for downlink, and/or a TVBD device at a cell edge with a restricted increase of licensed cell power. Example TVBD device initiated factors may include, a TVBD device detecting a need for higher bandwidth (e.g., starting high QoS application, high size of uplink buffer), and/or a TVBD device being interfered with in one or more licensed bands.

A CE may receive current spectrum usage information from an associated serving CM. The CE may pass the spectrum usage information to a CE network (e.g., a TVBD network device, such as a HeNB), such that the CE network may perform a spectrum allocation decision. Once the CE receives a spectrum decision from the CE network, the CE may send the spectrum decision to the serving CM. The CE may receive a co-channel sharing notice from the CM and may inform the CE network of the co-channel sharing notice.

Figure 6:
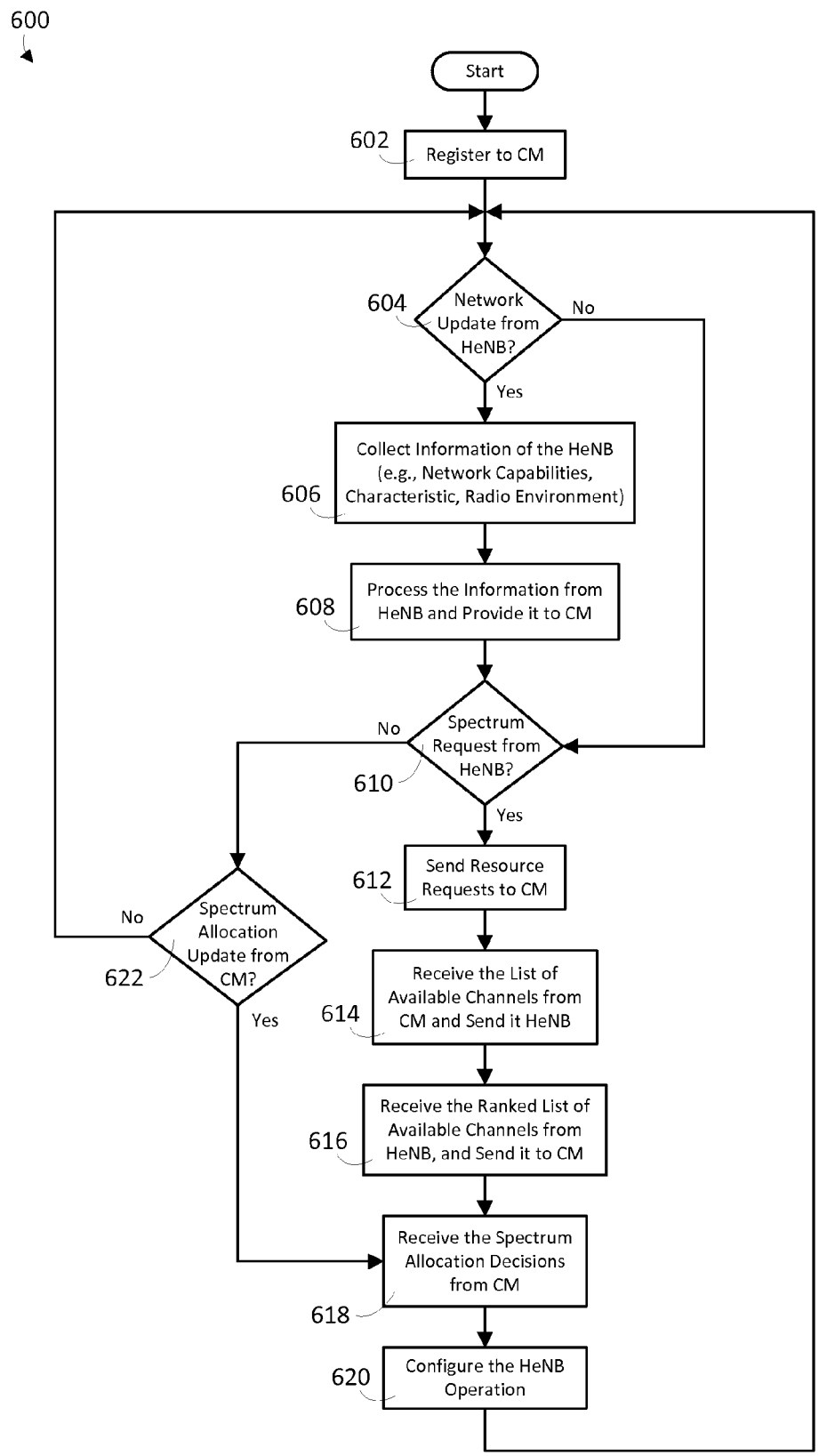
FIG. 6 illustrates an example coexistence enabler (CE) management service procedure.

FIG. 6 illustrates an example CE management service procedure 600. As shown, at 602 a CE may send a registration request to an associated CM. This operation may be the same as operation 402 illustrated in FIG. 4, for example.

At 604, the CE may receive a network update from a device (e.g., a TVBD device, such as an HeNB) that participates in a corresponding CE network (e.g., a TVBD network) associated with the CE. At 606, the CE may collect information pertaining to the TVBD device that may include one or more network capabilities of the TVBD device, one or more characteristics of the TVBD device, and/or a radio environment of the TVBD device, for example. At 608, the CE may process such information provided by the TVBD device and may provide the information to an associated CM. The CM may store or update an associated operator coexistence database, for example based on the collected TVBD device information.

At 610, the CE may receive a spectrum request from a CE network (e.g., a TVBD network device, such as a HeNB). At 612, the CE may forward the spectrum request to the CM. At 614, after receiving a list of available channels from the CM, the CE may forward the list of available channels to the CE network. The CE network may rank the channels on the list. At 616, the CE may receive the ranked list of available channels and may forward the ranked list to the CM. At 618, the CE may receive the spectrum decisions from CM, and at 620 the CE may configure operation of the CE network accordingly.

At 622, the CE may separately receive a spectrum allocation update from the CM. The CE may receive spectrum allocation without first sending a spectrum request. For example, the CE may receive spectrum allocation based on coordination and negotiation efforts of the CM. At 620, the CE may configure operation of the CE network in accordance with the received spectrum allocation update from the CM.

It should be appreciated that the illustrated operations of the example CE management service procedure 600 need not be illustrated in numerical order, and that less than all of the operations may be executed. For example, the example CE management service procedure 600 may include the execution of one or more of 604 to 608, 610 to 620, and 622 with 620, for example.

Two or more CMs may negotiate channel resource allocation based on tokens. The CMs may negotiate channel resource allocation using a process similar to a spectrum auction. Two or more negotiating CMs may evaluate the channel resources individually. For example, a first CM may prioritize reliability, while another CMs may prioritize peak data rate, etc.

The channel resources may be allocated to a CM that bids the most tokens during the negotiation. Tokens may be considered as a digital currency. A monetary value of tokens may be negotiated among the CMs. For example, a token may be exchanged for 0.01 USD. The winner of the bidding process may distribute the tokens among the other competing devices. For example, the tokens may be evenly distributed between the bidders. For example, the tokens may be distributed proportionally such that the higher bidders may receive more tokens. The highest bidder may give one or more tokens to the second highest bidder. The highest bidder may give one or more tokens to a current occupier of the channel. Tokens may be collected by a third party CM that may be responsible for paying the owner of the channel resources, for example in accordance with an exchange rate. Tokens may be collected by a master CM that may be responsible for paying the owner of the channel resources, for example in accordance with an exchange rate.

Figure 7:
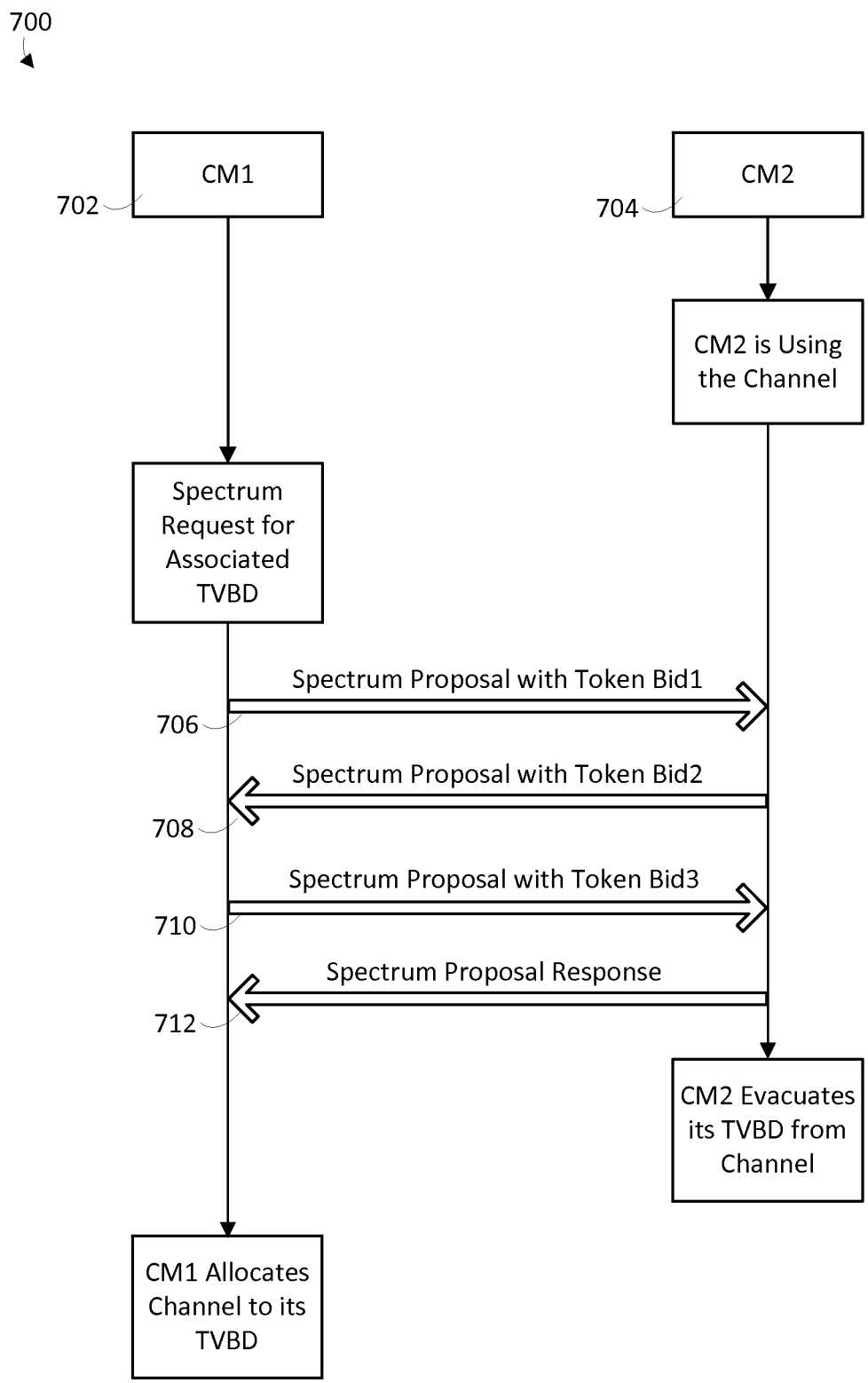
FIG. 7 illustrates an example negotiation-based auction between two CMs.

Channel resource allocation may be negotiated via a negotiation based auction. FIG. 7 illustrates an example negotiation-based auction between a first CM 702 and a second CM 704. A negotiation based interface may be provided. In the illustrated example negotiation, the first and second CMs 702, 704 may be located in the same region and may make one or more bids for a slot such as time, frequency and/or location. The second CM 704 may be using the channel and the first CM 702 may submit a spectrum request on behalf of an associated TVBD.

A number of bids may come in the form of spectrum proposals 706, 708, and 710. Each spectrum proposal may contain a field reserved for the number of tokens. One or both of the first and second CMs 702, 704 may be given the option to bid a larger number of tokens, or provide a spectrum proposal response. If a wining CM accepts a spectrum proposal response, a losing CM may, for example, withdraw from the channel during the proposed slot. In the illustrated example, the first CM 702 may submit a first spectrum proposal 706 with a first token bid. The second CM 704 may respond by submitting a second spectrum proposal 708 with a second token bid that is greater than the first token bid. The first CM 702 may respond by submitting a third spectrum proposal 710 with a third token bid that is greater than the third token bid. The second CM 704 may, responsive to the third spectrum proposal 710, submit a spectrum proposal response 712, and may evacuate an associated TVBD from the channel. The first CM 702 may then allocate the channel to an associated TVBD.

One or more operators may bid for a next available time slot. There may be a time limit on reservations. Each successive bid may be for a greater number of tokens than that of the previous bid.

Two devices, such as the first and second CMs 702, 704, may share the channel. A spectrum proposal may include a share flag indicating that the device may be willing to share the channel (e.g., with reduced transmission power).

One or more bid collisions may occur, for example if bids are sent from multiple CMs at the same time. An auction server may be used to determine which CM placed the bid first. An associated CDIS may determine a priority of the bids. A CM that currently occupies the channel may deal with negotiation (e.g., exclusively).

A channel resource allocation may be negotiated via a silent auction. The silent auction may be encrypted. One or more CMs may submit respective token bids for a slot (e.g., in time, frequency, and/or location), without knowledge of the bids from other CMs. A highest bidder may occupy the channel and may distribute tokens accordingly. In the event of a tie, a winner may be selected (e.g., randomly) between the highest bidders.

In a Nash equilibrium, a bidder who values the channel the most may win the channel. For example, it may be in the best interest of each operator to bid their proper valuation of a slot at a given time, for example to improve transmission efficiency (e.g., increase available transmission bandwidth).

One or more of a minimum bid increment, a minimum bid, and/or a maximum bid may be implemented. A device may bid 0 tokens, such that the device may occupy the spectrum in an absence of other contenders. A CM may encrypt its bid before sending the bid to a neighboring CM. A decryption key may be distributed, for example after the encrypted bids are received.

A management service based coexistence system may provide a full spectrum solution to one or more CE networks. The system may coordinate channel usage (e.g., TVWS channel usage) with one or more other CE networks belonging to the same operator, for example.

A coexistence discovery and information server (CDIS) may provide spectrum allocation for the CE networks. For example, a CDIS may include a database for storing neighbor discovery information and/or channel usage information. A CDIS, such as an advanced CDIS, may be used by a CM to reserve a channel. A CDIS, such as a smart CDIS, may include one or more functions of an advanced CDIS, and may make coexistence management decisions.

A CM may maintain an operator coexistence database, may update a CDIS and a TVWS database about one or more networks within the operator, may obtain TVWS usage information from a CDIS, may reserve channel resource information (e.g., TVWS channel resource information) at a CDIS, may allocate TVWS resources to one or more CE networks within the operator, and/or may coordinate TVWS usage between multiple CE networks within the operator.

One or more CMs may communicate with each other via the CDIS (e.g., may communicate indirectly with each other, via the CDIS). One or more associated CE networks may function, for example, as described with respect to the example of direct CM to CM communication.

A CDIS may perform one or more discovery operations and may include channel usage information (e.g., TVWS channel usage information). A CM may reserve a number of channel resources, for example by populating an associated CDIS with information about an occupying CE network. This type of CDIS may be referred to herein as an advanced CDIS. An advanced CDIS that may be capable of making coexistence management decisions may be referred to herein as a smart CDIS.

CE network information may include a geo-location of the CE network, a Tx power class and/or a Tx antenna height, an identification address of the CE network, a radio technology used in the CE network, a coverage area of the network, and/or operator information, for example.

Figure 8:
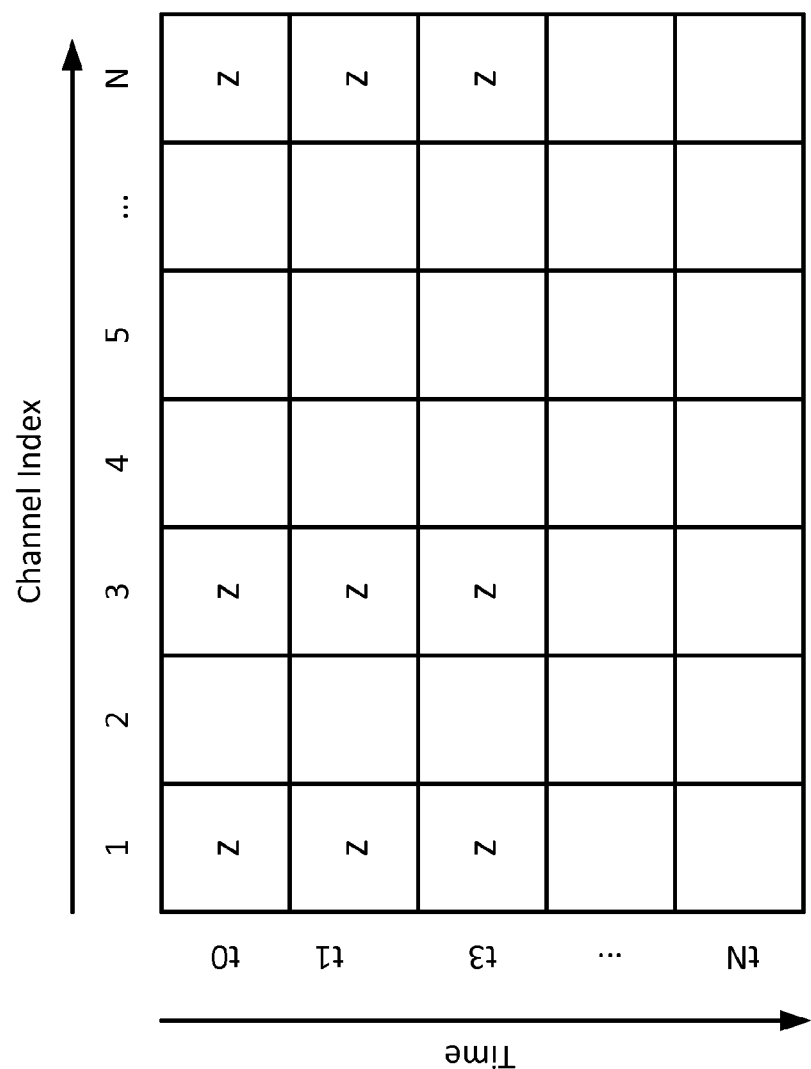
FIG. 8 shows an example TV white space (TVWS) resource usage information.

TVWS channel usage information may include one or more channels (e.g., TVWS channels) that are reserved by one or more networks, and/or one or more lengths of time for which respective TVWS channels will be occupied by the one or more networks. FIG. 8 shows example TVWS resource usage information 800 at a certain location. As shown, channels 1, 3 and N may be reserved by a CE network with address z from time slot t0 to time slot t3.

In the case of co-channel sharing, a CM may reserve a portion of a channel resource, while leaving a remaining portion of the channel resource for the use of one or more other CMs. For example, a channel may be partitioned into sub-channels, and a CM may reserve a portion of the sub-channels. Each time block may be partitioned to sub-blocks, for example, and a CM may reserve a portion of the sub-blocks.

A CDIS may provide TVWS channel usage information to one or more CMs, for example based on respective locations and/or respective channel usage periods of the one or more CMs. The CDIS may be considered as a white board with three dimensional tables, with time, frequency (or channel), and location being the dimensions. In a specific location, the TVWS channel usage information may be represented in two dimensional tables, with time and channel being the dimensions. The CDIS may partition a time line into small units, and each coordinate set (e.g., time unit, channel) may be set as a single resource block. A CM may check the fullness of one or more resource blocks at a given location. If there is an empty resource block, the CM may reserve it, which may prevent other CMs from using the resource block.

An operator coexistence database may store channel usage information (e.g., TVWS channel usage information) that may be associated with one or more secondary networks within a network of an operator. A CE may collect information on network capabilities and/or resource needs. The CE may provide the information to the CM. The CE may forward the spectrum usage information from the CM to one or more CE networks, and may forward processed spectrum information back to the CM. After receiving the resource allocation decisions from the CM, the CE may configure operation of the one or more CE networks accordingly.

A first come first serve rule may be implemented. A CM may reserve a channel resource block (e.g., a TVWS channel resource block) if the block has not been reserved. One or more other rules (e.g., an FCC rule for FCC certified devices) that may take factors such as fairness among CMs into account, may be implemented for channel reservation.

One or more limitations may be imposed on reservations from a CM. For example, a number of channels (e.g., TVWS channels) to be reserved, and/or respective durations of each reservation may be limited to a predetermined value. Such limitations may prevent a CE network from occupying a channel too long, such that other CE networks may not access the resource. In accordance with a limitation on each channel reservation, a CM may reserve a channel (e.g., a TVWS channel) consecutively to continuously use a channel.

A presently occupying first CE network may be prohibited from making a second channel reservation and/or a channel renewal, for example until an end of the current channel occupation, such that the channel may be available to one or more other CE networks. In other words, one or more other CE networks may reserve the channel at any time during the occupation period of the first CE network. This limitation may prevent a CE network from reserving a channel resource when the CE network may not need it, for example when the CE network may continue to operate effectively without the addition of the channel resource. The reservation of the current unused channel resource may affect a future channel reservation that may be useful to a CE network. Some CE networks may reserve more channel resources than other CE networks, for example based on respective network situations of the CE networks (e.g., the number of TVBDs in the network, a QoS requirement of the network, and/or a number of token the network is willing to pay, etc.).

Figure 9:
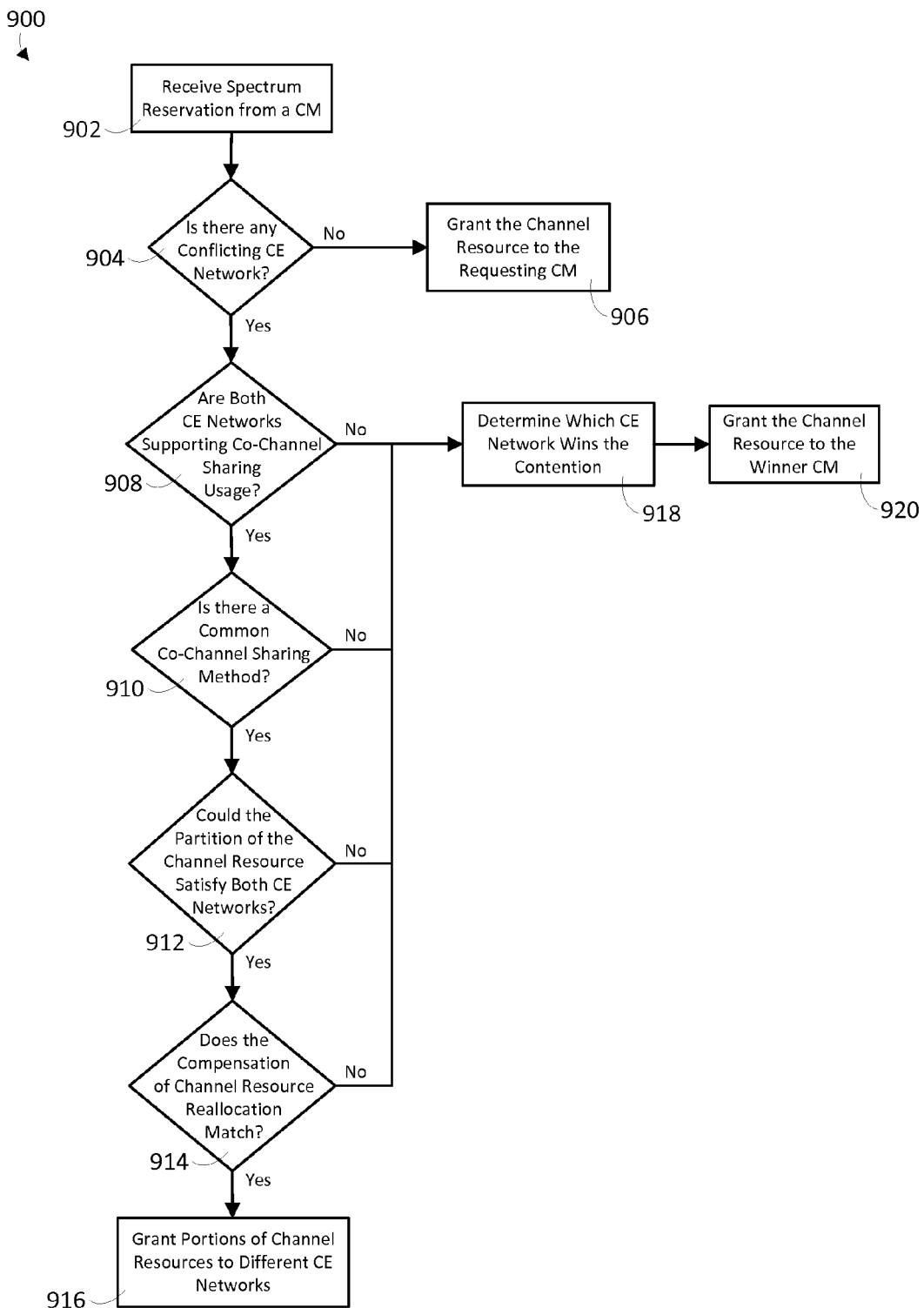
FIG. 9 illustrates an example procedure performed by a smart coexistence discovery and information server (CDIS).

A CDIS, such as a smart CDIS, may function like a coordinator to resolve coexistence issues raised by one or more different operators. FIG. 9 illustrates an example procedure 900 that may be performed by a smart CDIS. At 902, the CDIS may receive a CDIS spectrum reservation from an associated CM. When the CDIS receives the spectrum reservation message, the CDIS may, at 904, determine whether the reservation affects the reservations of one or more other CMs. If there is no conflict, the CDIS may, at 906, grant the reservation and may send a CDIS spectrum reservation response message to the requesting CM.

The new reservation may affect an existing reservation. For example, two or more neighboring CE networks may want to use the same channel (e.g., TVWS channel). The CDIS may determine how co-channel sharing may be achieved. For example, the CDIS may check to see if both CE networks support the co-channel sharing usage (at 908); may check if there is a common co-channel sharing method supported by both networks (at 910); may check if there is a partition of the channel resource that may satisfy both networks (at 912); and/or may check whether a compensation resulting from the co-channel sharing decision is acceptable to both networks (at 914).

If the answers to the above questions at 908, 910, 912, and 914 are positive, the CDIS may schedule a co-channel sharing usage. At 916, the CDIS may grant one or more different portions of the channel resources to corresponding different CE networks. If one or more of the answers to the above questions at 908, 910, 912, and 914 is negative the CDIS may schedule an exclusive channel usage. At 918, the CDIS may determine which CE network may occupy the channel. For example, the CDIS may base the determination on which network reserved earlier, which network has higher QoS requirements, which network has more TVBD devices, and/or which network may be willing to pay more tokens for the resource, or the like. After the CDIS makes the decision, the CDIS may, at 920, inform the involved networks, for example by sending respective CDIS spectrum reservation response messages.

An operator coexistence database implemented in a coexistence management service system having an advanced CDIS or a smart CDIS, may function the same or substantially the same, for example, as described herein with respect to a coexistence management service with CM communication.

A coexistence manager in a coexistence management service system may function differently, for example depending on the functionality of an associated CDIS. For example, when using an advanced CDIS, the CM may be responsible for making spectrum allocation decisions. When using a smart CDIS to make a spectrum allocation decision, the CM may not be responsible for making spectrum allocation decisions.

Figure 10:
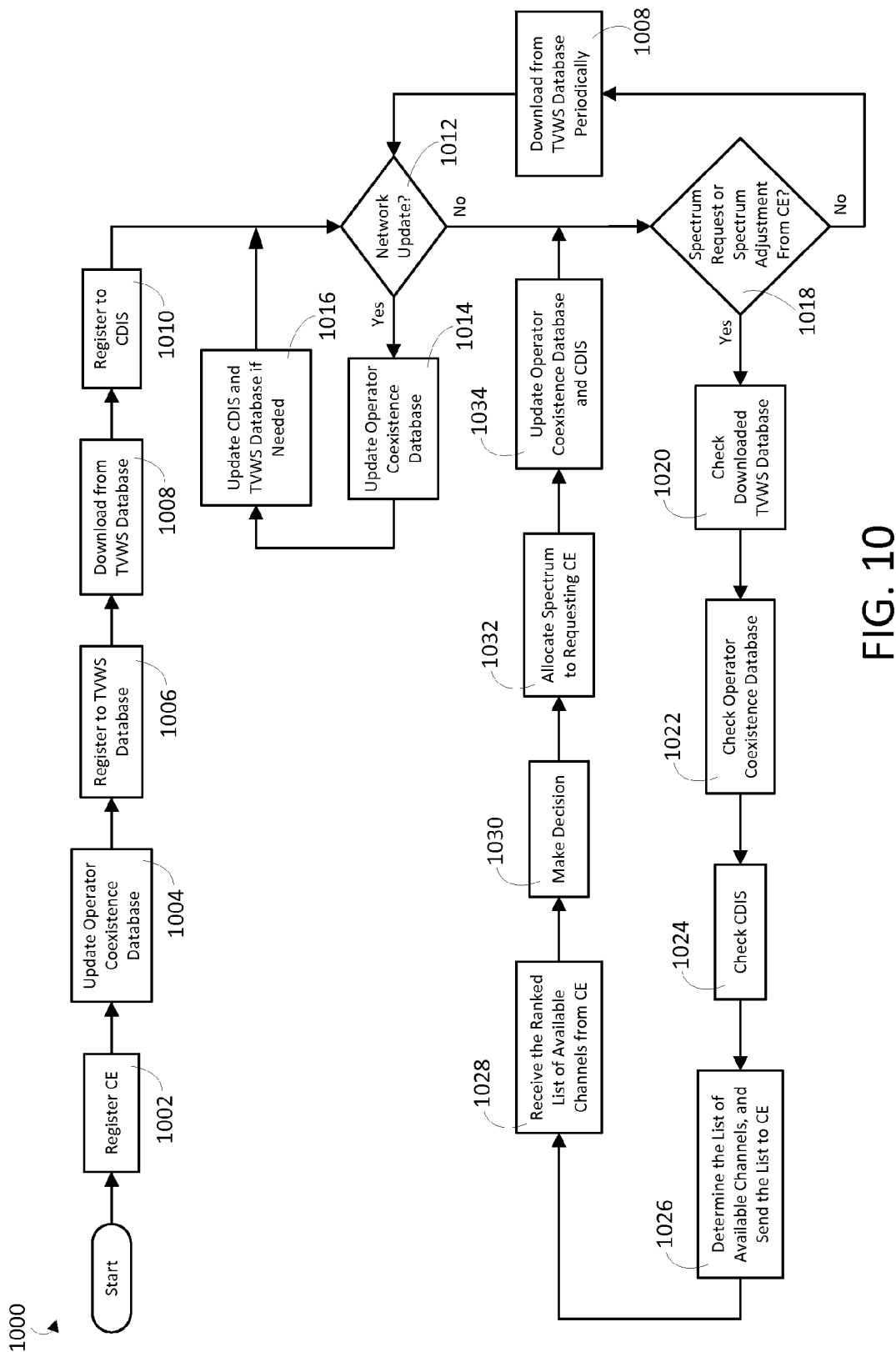
FIG. 10 illustrates an example CM management service procedure with an advanced CDIS.

FIG. 10 illustrates an example CM procedure 1000 for a coexistence management service system with an advanced CDIS. When a CE is capable of operating in a band (e.g., a TVWS band), the CE may, at 1002 send a registration request to the CM. In this registration, the CM may collect network information pertaining to the CE, such as a network ID, network administrator contact information, information pertaining to one or more TVBDs within the CE (e.g., respective device IDs, respective device types, respective device serial numbers, a location, a transmission antenna height, etc.). At 1004, the CM may store such information in an operator coexistence database.

At 1006, the CM may register one or more CE networks by providing certain TVBD information that may include, for example, a device ID, a device type, a serial number, a device location, contact information, etc.

After the registration process is completed, the CM may acquire, from the TVWS database at 1008, TVWS usage information that may be related to one or more primary users within respective coverage areas of one or more activated CE networks associated with a core network. The TVWS database information download 1008 may occur periodically, for example every day. The download frequency may be specified in a policy, for example in accordance with FCC rules.

At 1010, the CM may register one or more CE networks to the CDIS, for example by providing certain CE network information that may include, for example, a network location, a network coverage area, network operator contact information, etc. The CM may provide channel usage information (e.g., TVWS channel usage information) to the CDIS.

At 1012, the CM may receive CE a network update, for example from a CE. At 1014, the CM may update the operator coexistence database based on the CE network update. At 1016, the CM may update the TVWS database and/or the CDIS based on the CE network update. For example, when the location of a Mode II TVBD device (e.g., a HeNB) changes, the CM may update the TVWS database and the CDIS.

At 1018, the CM may receive a spectrum request or spectrum adjustment, for example from an associated CE network (via its associated CE). At 1020, 1022, and/or 1024, respectively, the CM may, depending on the CE network location, check the downloaded TVWS database, the operator coexistence database, and/or the CDIS, for example to determine if there is an available channel in the location.

At 1026, the CM may collect the information and may summarize a list of available channels. The CM may send the list of available channels to the CE. The list may be ranked by the CM. The CE may rank the available channels, for example using information available at the CE. The rank may depend, for example, on the local radio environment. At 1028, the CM may receive the ranked available channels from the CE. At 1030, the CM may make a spectrum allocation decision for the requesting CE network and may indicate the reservation of the one or more channels (e.g., TVWS channels) in the CDIS. For an exclusive channel allocation, the channel reservation may be channel based. For a co-channel sharing allocation, the reservation may be sub-channel or resource block based, for example.

At 1032, the CM may inform the spectrum allocation decision to the requesting CE network. At 1034, the CM may update the operator coexistence database for this allocation. The final spectrum allocation may affect channel resource usage among one or more CEs within the same operator. For example, the CM may sacrifice part of the TVWS channel resources of one CE for another CE within the same operator. If there is a TVWS channel assignment change within an operator network, for example, the CM may update the CDIS at 1034.

It should be appreciated that the illustrated operations of the example CM procedure 1000 need not be illustrated in numerical order, and that less than all of the operations may be executed. For example, the example CM procedure 1000 may include the execution of one or more of 1002 to 1010, 1012 to 1016, 1018 to 1034, and 1008, for example.

Figure 11:
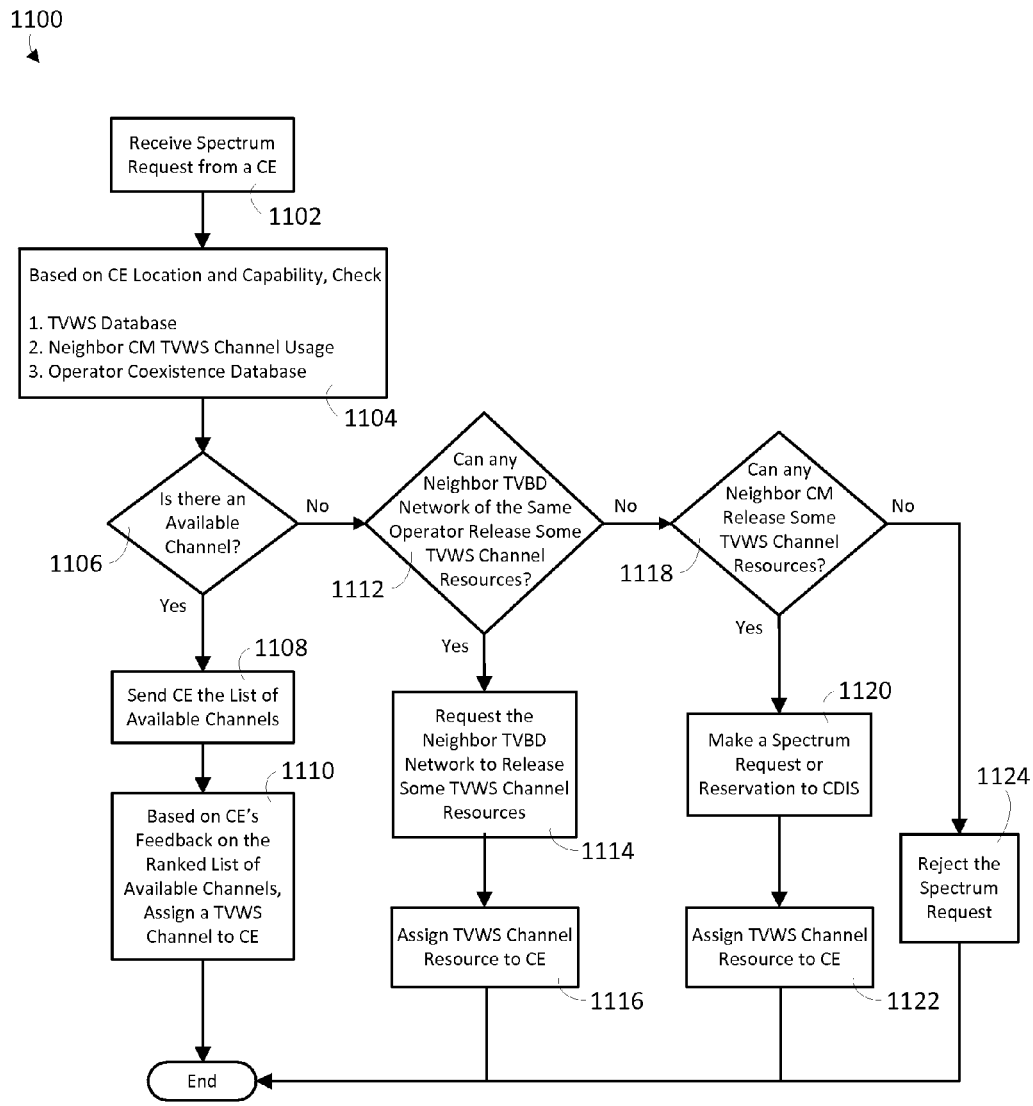
FIG. 11 illustrates an example CM channel reservation decision making procedure.

Multiple decision-making and/or channel reservation algorithms, and/or one or more policies may be provided. FIG. 11 illustrates an example CM channel reservation decision making procedure 1100. At 1102, the CM may receive a spectrum request, for example from an associated CE. At 1104, the CM may, depending on a network location and/or capability of the requesting CE, check one or more of a downloaded database (e.g., a TVWS database), channel usage (e.g., TVWS channel usage) of one or more neighbor CMs, and an operator coexistence database, for one or more available channels in that location.

At 1106, the CM may determine whether a channel is available. If there are one or more available channels, the CM may, at 1108, send a list of the one or more available channels to the requesting CE. At 1110, the CM may, based on feedback received from the requesting CE that pertains to the ranked list of available channels on, assign an available channel resource (e.g., an available TVWS channel) to the requesting CE.

At 1112, if the CM determines that there is no available channel, the CM may determine whether a neighbor TVBD network of the same operator may release one or more channel resources (e.g., TVWS channel resources). If a neighbor TVBD network of the same operator may release one or more channel resources, the CM may request that the neighbor TVBD network to release the channel resource at 1114, and may assign the channel resources to the requesting CE at 1116.

If the CM determines that no neighbor TVBD network of the same operator may release one or more channel resources, the CM may, at 1118, determine whether a neighbor CM may release one or more channel resources (e.g., TVWS channel resources). If a neighbor CM may release one or more channel resources, the CM may negotiate with the neighbor CM for the channel resources at 1120, and may assign the channel resources to the requesting CE at 1122.

If the CM determines that there is no available channel, that no neighbor TVBD network of the same operator may release one or more channel resources, and/or that no neighbor CM may release one or more channel resources, the CM may, at 1124, reject the spectrum request.

It should be appreciated that the illustrated operations of the example CM channel reservation decision making procedure 1100 need not be illustrated in numerical order, and that less than all of the operations may be executed.

Figure 12:
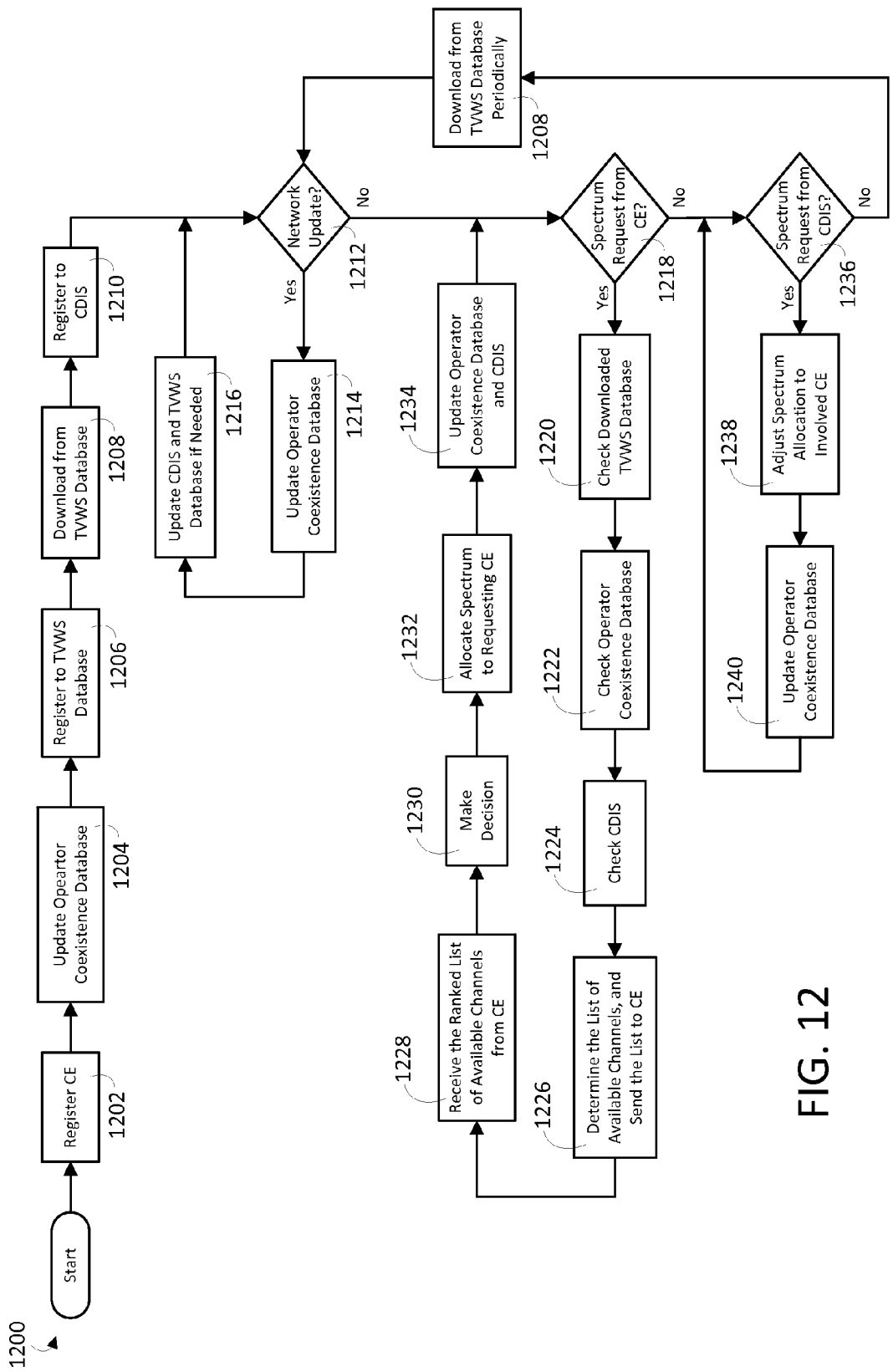
FIG. 12 illustrates an example CM management service procedure with a smart CDIS.

A CM may be configured to be compatible with a smart CDIS. FIG. 12 illustrates an example CM management service procedure 1200 with a smart CDIS. When a CE is capable of operating in a band (e.g., a TVWS band), the CE may, at 1202 send a registration request to the CM. In this registration, the CM may collect network information pertaining to the CE, such as a network ID, network administrator contact information, information pertaining to one or more TVBDs within the CE (e.g., respective device IDs, respective device types, respective device serial numbers, a location, a transmission antenna height, etc.). At 1204, the CM may store such information in an operator coexistence database.

At 1206, the CM may register one or more CE networks, with one or more fixed or Mode II TVBDs (e.g., a HeNB), to the TVWS database, by providing certain TVBD information that may include, for example, a device ID, a device type, a serial number, a device location, contact information, etc.

After the registration process is completed, the CM may acquire, from the TVWS database at 1208, TVWS usage information that may be related to one or more primary users within respective coverage areas of one or more activated CE networks associated with a core network. The TVWS database information download 1208 may occur periodically, for example every day. The download frequency may be specified in a policy, for example in accordance with FCC rules.

At 1210, the CM may register one or more CE networks to the CDIS, for example by providing certain CE network information that may include, for example, a network location, a network coverage area, network operator contact information, etc. The CM may provide channel usage information (e.g., TVWS channel usage information) to the CDIS.

At 1212, the CM may receive CE a network update, for example from a CE. At 1214, the CM may update the operator coexistence database based on the CE network update. At 1216, the CM may update the TVWS database and/or the CDIS based on the CE network update. For example, when the location of a Mode II TVBD device (e.g., a HeNB) changes, the CM may update the TVWS database and the CDIS.

At 1218, the CM may receive a spectrum request or spectrum adjustment, for example from an associated CE network (via its associated CE). At 1220, 1222, and/or 1224, respectively, the CM may, depending on the CE network location, check the downloaded TVWS database, the operator coexistence database, and/or the CDIS, for example to determine if there is an available channel in the location.

At 1226, the CM may collect the information and may summarize a list of available channels. The CM may send the list of available channels to the CE. The CE may rank the available channels. The rank may depend, for example, on the local radio environment. At 1228, the CM may receive the ranked available channels from the CE. At 1230, the CM may make a spectrum allocation decision for the requesting CE network and may indicate the reservation of the one or more channels (e.g., TVWS channels) in the CDIS. For an exclusive channel allocation, the channel reservation may be channel based. For a co-channel sharing allocation, the reservation may be sub-channel or resource block based, for example.

At 1232, the CM may inform the spectrum allocation decision to the requesting CE network. At 1234, the CM may update the operator coexistence database for this allocation. The final spectrum allocation may affect channel resource usage among one or more CEs within the same operator. For example, the CM may sacrifice part of the TVWS channel resources of one CE for another CE within the same operator. If there is a TVWS channel assignment change within an operator network, for example, the CM may update the CDIS at 1234.

At 1236, the CM may respond to a co-channel sharing request from an associated smart CDIS. If a CM receives a co-channel sharing request from CDIS, the CM may let one or more involved CEs follow the request. At 1238, the CM may adjust respective spectrum allocations to one or more involved CEs, for example in accordance with the request from the smart CDIS. At 1240, the CM may update the operator coexistence database accordingly.

It should be appreciated that the illustrated operations of the example CM procedure 1200 need not be illustrated in numerical order, and that less than all of the operations may be executed. For example, the example CM procedure 1200 may include the execution of one or more of 1202 to 1210, 1212 to 1216, 1218 to 1234, 1236 to 1240, and 1208, for example.

One or more CEs implemented in a coexistence management service system having an advanced CDIS or a smart CDIS, may function the same or substantially the same, for example, as described herein with respect to a coexistence management service with CM communication.

Co-channel sharing may be facilitated via an advanced CDIS. To handle a region with heavy traffic or scarce channel resources, multiple CE networks may share one or more channels (e.g., TVWS channels). For example, one or more CE networks may share a channel via TDM, FDM, interference management, and/or token-based sharing.

For example, one or more CE networks may share channels (e.g., TVWS channels) via TDM with a channel time limit. An associated CDIS may act as a three dimensional whiteboard, with channel, time, and location being the coordinates. An entry in the CDIS may include information indicating one or more occupying CE network IDs, a reservation time frame, and/or one or more queued CE network IDs. One or more CMs may reserve timeslots on a first come first serve basis, reserving a channel for a specified (e.g., maximum) amount of time (e.g., 5 minutes). One or more additional CMs may wait in a queue if they request the same channel.

One or more CE networks may share channels (e.g., TVWS channels) via FDM with channel subdividing, for example. An associated CDIS may act as a three dimensional whiteboard, with channel, time, and location being the coordinates. An entry in the CDIS may include information indicating one or more occupying CE network IDs, a reservation time frame, a subdivision flag and/or a sub-channel array. A sub-channel array may include one or more occupying CE network IDs and a corresponding reservation timeframe. The CDIS may turn on a subdivision flag, for example if there are multiple CMs requesting the same channel. One or more CMs may reserve the sub-channels.

One or more CE networks may share channels (e.g., TVWS channels) via interference management. One or more CMs may reserve a channel and may use the channel provided they do not interfere with one or more TVBDs using the channel. One or more CMs may avoid interfering by reducing respective Tx powers, using spatial multiplexing (e.g., MIMO beam forming, sectoring), etc., for example. An associated CDIS may act as a three dimensional whiteboard, with channel, time, and location being the coordinates. An entry in the CDIS may include information indicating an occupying CE network ID, a power allocated, an interference report, a reservation timeframe, one or more additional CE network IDs, one or more additional power allocations, and/or one or more additional interference reports. Devices using the channel may periodically report their interference levels to the CDIS, such that other devices may make decisions.

One or more CE networks may share channels (e.g., TVWS channels) via regenerating tokens. An associated CDIS may periodically distribute tokens to one or more CMs based on, for example, a number of users the CM has and/or respective QoS associated with the one or more CMs. The one or more CMs may use the tokens to bid on timeslots. An associated CDIS may act as a three dimensional whiteboard, with channel, time, and location being the coordinates. An entry in the CDIS may include information indicating an occupying CE network ID, a reservation timeframe, information pertaining to one or more queued CMs, one or more CE network IDs, and/or one or more token bids.

Co-channel sharing may be achieved by one or more earlier CMs reserving only a portion of the channel resources, while one or more later CMs use a remaining portion of the channel resources. The one or more earlier CMs may not use the full channel resource even if there are no other CMs sharing the same channel. Co-channel sharing may be dynamically changed. A first CM may use the full channel resource at the reservation. If another, second CM wants to share the channel resource with the first CM, the first CM may release partial channel resources.

One or more co-channel sharing operations may be coordinated by a smart CDIS. The smart CDIS may make channel resource allocation decisions for conflicting CMs. A channel resource allocation decision making procedure may be implemented by a third party.

A CDIS may include information on networks served by one or more associated CMs, for example the number of TVBDs in a CE network, the QoS requirement of the CE network, or the like. This information may be summarized to a coexistence value. The CDIS may make coordination decisions based on respective CM coexistence values, for example.

Two or more CMs may reserve a channel resource by providing tokens. For example, the two or more CMs may reserve a channel resource using a process similar to a spectrum auction process. Different CMs may evaluate the channel resources in respective different ways. For example, some CMs may prioritize reliability, while other CMs may prioritize peak data rate, etc.

A winner of a bidding process may distribute tokens among the competing devices. For example, the tokens may be evenly distributed between the bidders. The tokens may be distributed proportionally such that the higher bidders may receive more tokens. The highest bidder may give tokens to the second highest bidder. The highest bidder may give one or more tokens to a current holder of the channel.

Two or more CMs may reserve channel resource via a standard auction and/or via a silent auction. In a standard auction, two or more CMs may bid for the same slot (e.g., in time, frequency, and/or location). A first CM to bid any number of tokens may receive and may hold a title of highest bidder. One or more other CMs may have the option to place a higher bid and may become the highest bidder. If a CM holds the title of highest bidder for a predetermined period of time, that CM may be declared the winner.

Figure 13:
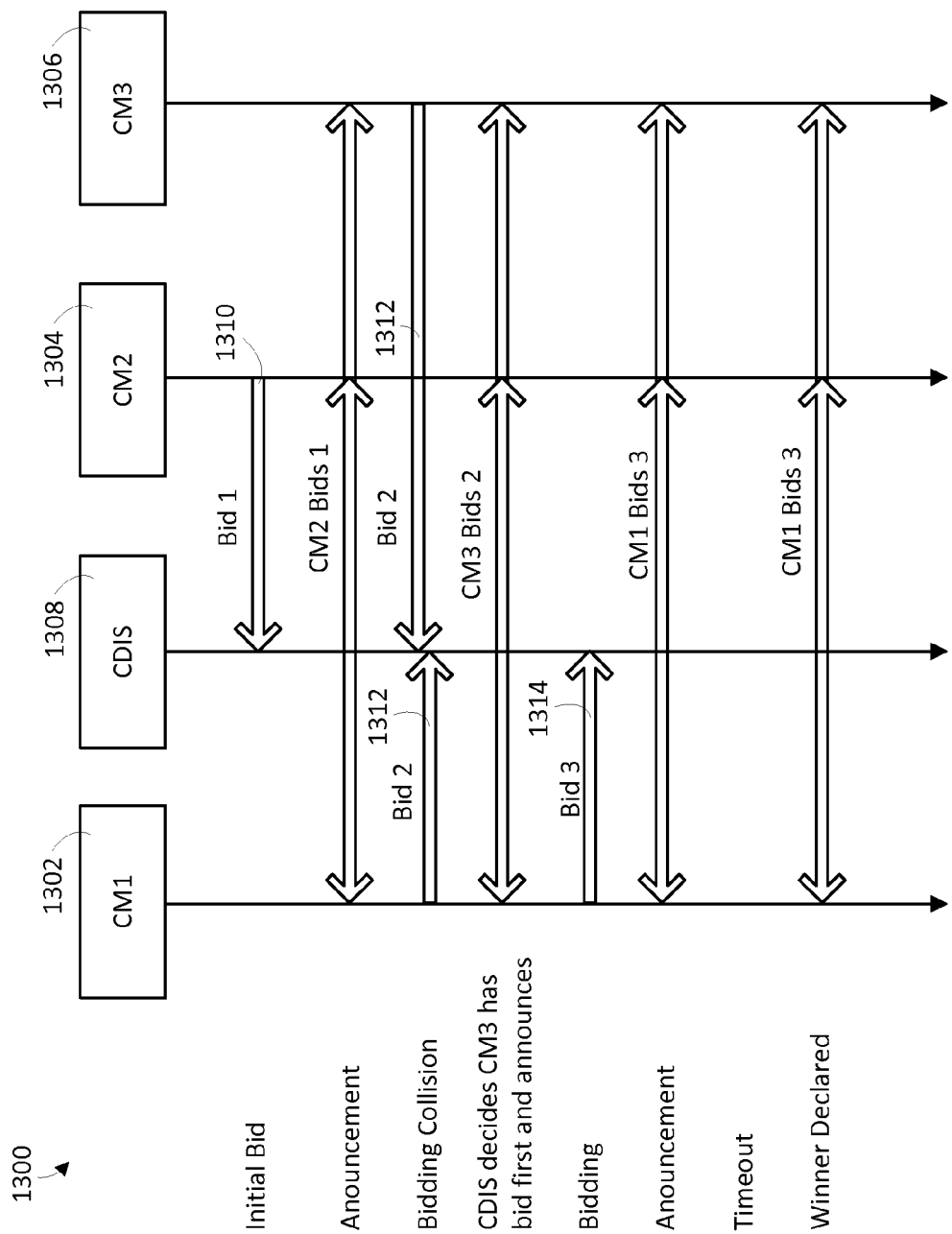
FIG. 13 illustrates an example process for a CDIS-based auction for resolving bid collisions.

FIG. 13 illustrates an example process 1300 for a CDIS based auction for resolving bid collision. The winner CM may transmit during the contended slot and may pay tokens to one or more of the other contending CMs.

The CMs may bid for a slot (e.g., time, frequency, and/or location) by sending a CDIS Spectrum Reservation message to the CDIS. The CDIS may relay the highest bidder information for each round to the other competing CMs. In the case of two equal bids arriving in a short timeframe, the CDIS may determine the priority of the competing CMs based on which reached the CDIS first.

In the illustrated example negotiation, bidding takes place between a first CM 1302, a second CM 1304, and a third CM 1306. The bidding process may be moderated by the CDIS 1308. An initial bid 1310 for a slot may be sent by the second CM 1304 to the CDIS 1308. The CDIS 1308 may communicate indications of the first bid 1310 to the first, second, and third CMs 1302, 1304, and 1306. The third CM 1306 may submit a second bid 1312 to the CDIS 1308 and the first CM 1302 may submit a second bid 1314 to the CDIS 1308.

The second bids 1312 and 1314 may arrive at the CDIS 1308 within a short time frame of each other, and thus may be considered as colliding bids. The CDIS 1308 may resolve the bid collision, for example by determining that the second bid from the third CM 1306 arrived just before that of the first CM 1302, and may communicate indications of the second bid 1312 to the first, second, and third CMs 1302, 1304, and 1306. The first CM 1302 may submit a third bid 1314. The CDIS 1308 may communicate indications of the third bid 1314 to the first, second, and third CMs 1302, 1304, and 1306. After expiration of a predetermined timeout period, if no additional bids are received at the CDIS 1308, the CDIS 1308 may communicate indications declaring the first CM 1302 as the winner to the first, second, and third CMs 1302, 1304, and 1306. The CDIS 1308 may allocate the slot to the first CM 1302.

Figure 14:
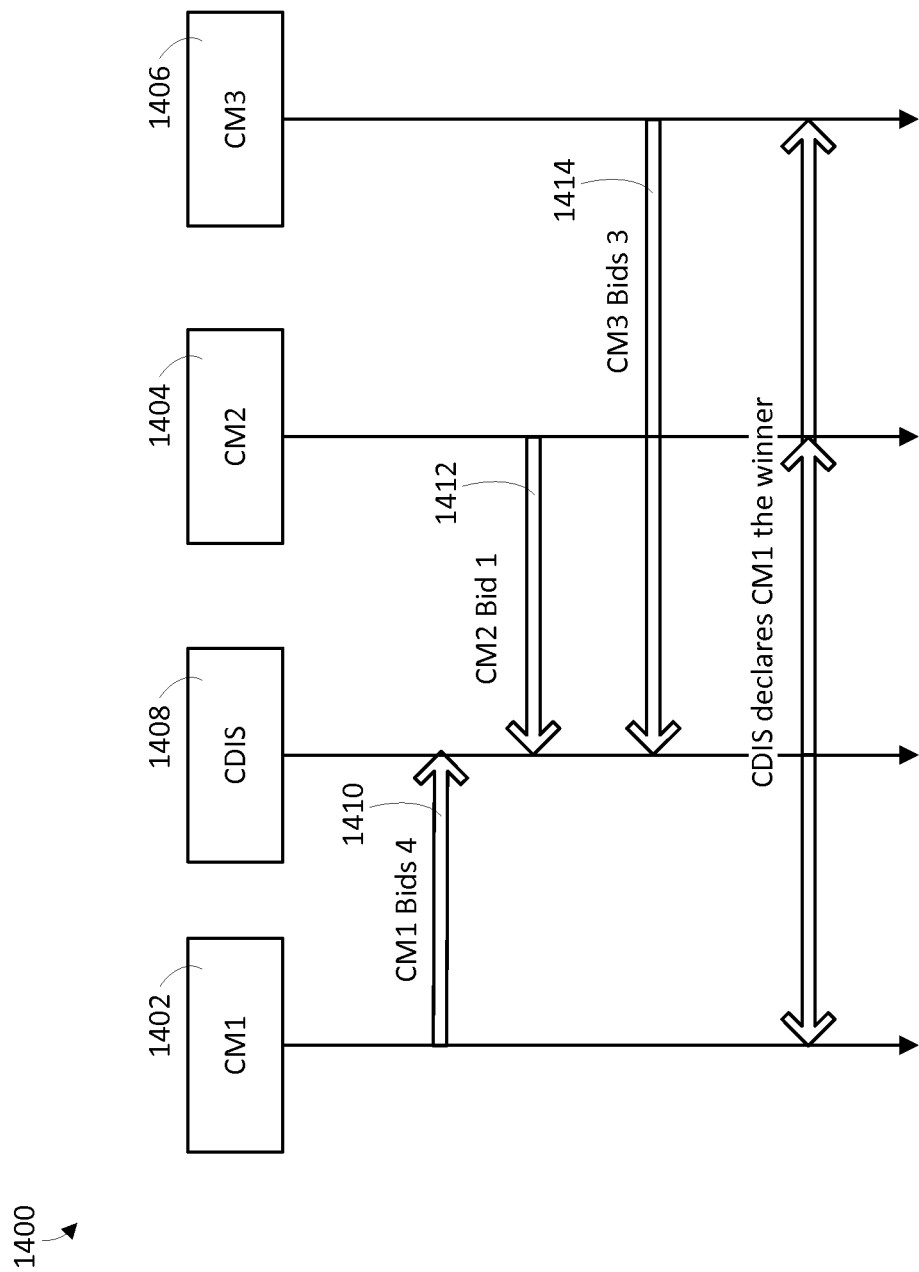
FIG. 14 illustrates an example process for a CDIS-based silent auction.

FIG. 14 illustrates an example process 1400 for a CDIS-based silent auction. In a silent auction, the CMs may submit a token bid for a slot (e.g., in time, frequency, and/or location), without knowledge of the bids of the other CMs. The highest bidder may occupy the channel. In the event of a tie, the winner may be randomly selected between the highest bidders. The silent auction may be encrypted. The CMs may submit bids in a predetermined time window. Upon expiry of the time window, the highest bidder may be declared the winner, and may occupy the contended slot. The CDIS may send the operators the results of the bidding. The CMs may bid for a next available time slot. There may be a reasonable time limit on reservations. Each bid may be for a greater number of tokens than the previous bid.

In the illustrated example negotiation, bidding takes place between a first CM 1402, a second CM 1404, and a third CM 1406. The bidding process may be moderated by the CDIS 1408. The first, second, and third CMs 1402, 1404, and 1406 may submit respective first, second, and third bids 1410, 1412, and 1414. The CDIS 1408 may determine that the first bid 1410 from the first CM 1402 was the highest bid, and may communicate indications declaring the first CM 1402 as the winner to the first, second, and third CMs 1402, 1404, and 1406. The CDIS 1408 may allocate the slot to the first CM 1402.

The highest bidder may pay the number of token in its bid. For example, a first CM may post a bid of 0 for a slot. If a second CM bids 1 token and wins the bid, the first CM may receive 1 token from the winning second CM.

The highest bidder may pay an amount equal to the second highest bid. For example, a first CM may post a bid of 0 for a slot. If a second CM bids 1 token and wins the bid, the first CM may receive 0 tokens from the winning second CM. Such a payout may deter CMs from submitting bids for the purposes of gaining tokens from a winning CM rather than occupying the contended slot.

A coexistence management service system may be implemented for licensed bands where a primary user may allocate a temporary license to use the system (e.g., available licensed spectrum resources) to one or more competing systems. The spectrum owner of the licensed band (which may be referred to as a primary operator) may lease the band for a certain time period at a certain location. The primary operator may be associated with a CM that may handle band leasing issues. The spectrum leasing process may be coordinated by a smart CDIS, for example.

A licensed band may include a white space band. For example, a primary operator may include a DTV station, which may use TV channels as a primary user. When the DTV station does not broadcast TV signals in a certain time period, the DTV station may lease one or more TV channels to one or more systems to use the band (e.g., the one or more TV channels) with a temporary license. Such a license may grant exclusive usage during the time period by the licensee system, and/or may grant partial sharing between multiple licensees. One or more licensees may be guaranteed to obtain a threshold level of QoS from the band.

Figure 15:
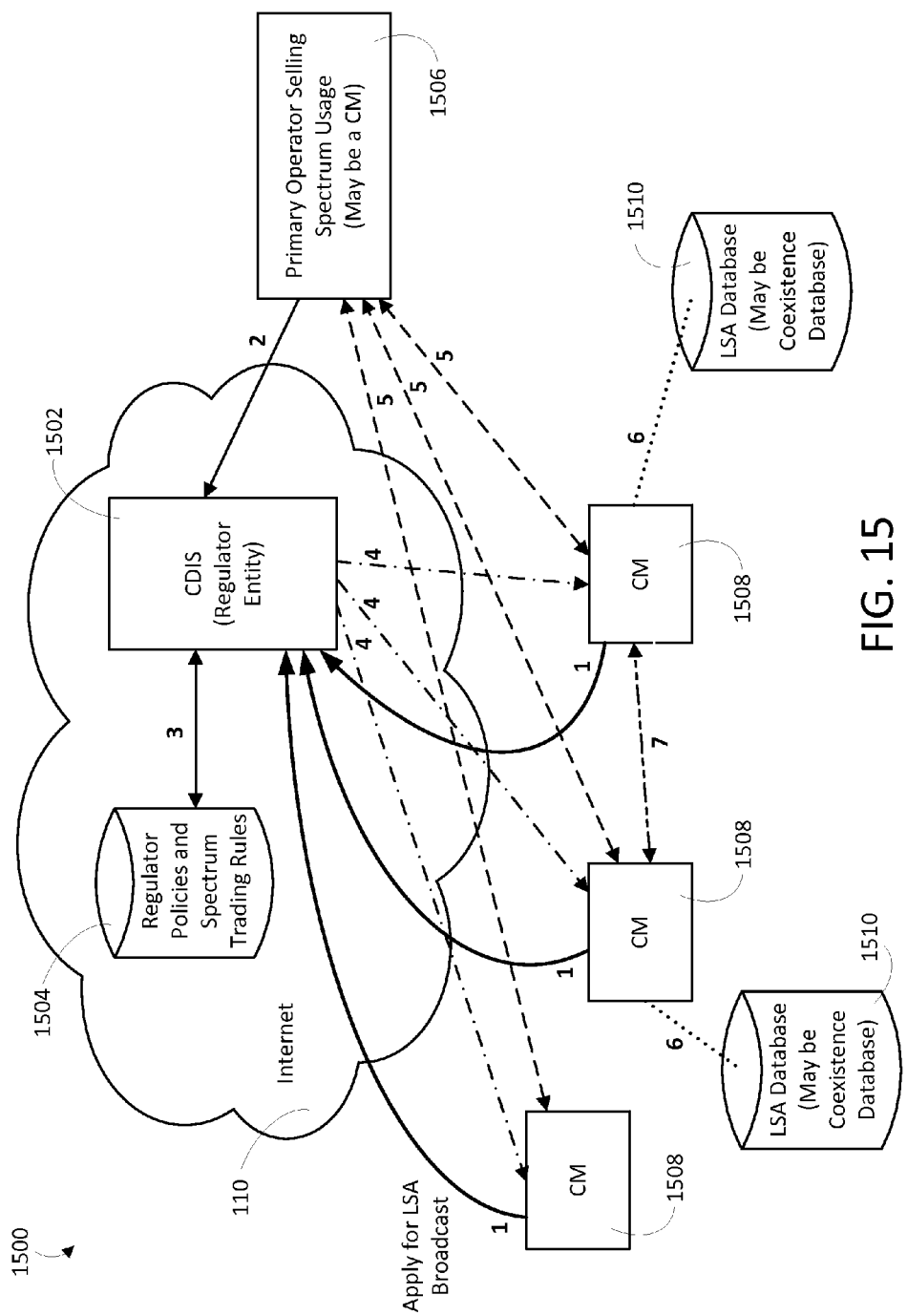
FIG. 15 illustrates an example architecture for license shared access (LSA) with CM communication.

FIG. 15 illustrates an example architecture 1500 for implementing licensed shared access (LSA) with CM communication. The architecture 1500 may include a CDIS 1502 and a regulator policies and/or spectrum trading rules database 1504. The CDIS 1502 and/or the database 1504 may be located, for example, in the Internet 110. The architecture 1500 may include an operator node 1506 of a primary operator that may be selling usage of licensed spectrum. The operator node 1506 may be configured to operate as a CM, for example.

The architecture 1500 may include one or more CMs 1508 and one or more LSA databases 1510. One or more of the LSA databases 1510 may be configured as coexistence databases. Respective ones of the CMs 1508 and the LSA databases 1510 may be associated with the same or different carriers (e.g., network operators). As shown, the architecture 1500 may include first, second, and third CMs 1508, and first and second LSA databases 1510.

An example CM management service process is illustrated using the example architecture 1500. At 1, one or more CMs 1508 may apply to receive LSA broadcast messages from the CDIS 1502 that may be indicative of the availability of a resource in the licensed spectrum (e.g., the LSA spectrum). The CMs 1508 may apply to receive LSA broadcasts, for example, by transmitting a message to the CDIS 1502 that is indicative of a subscription to the broadcasts.

One or more of the CMs 1508 may apply to receive LSA broadcasts based on one or more criteria and/or preference parameters that may include, for example, a cost of an available resource, a frequency band of the available resource, restrictions imposed on the available resource (e.g., exclusive usage, shared usage, usage which may be interruptible, etc.), a geographical location where the available resource may be used, a duration of the usage, or the like. The CDIS 1502 may use such criteria and/or preference parameters to filter one or more broadcasts. For example, the CDIS 1502 may use such criteria and/or preference parameters to prepare and/or send a specific (e.g., targeted) broadcast. Recipients of such a broadcast may be limited to, for example, one or more CMs whose criteria match one or more characteristics associated with available spectrum (e.g., spectrum that becomes available for use). The CMs 1508 may receive these filtered broadcasts from the CDIS 1502, for example based on the criteria. One or more broadcasts may be filtered based upon the criteria and/or preference parameters.

At 2, the primary operator may communicate with the CDIS 1502, for example via the operator node 1506, to indicate that the primary operator wishes to sell and/or lease the usage of an available resource in the licensed spectrum to one or more licensees. The operator node 1506 may be configured as a CM, or as a CM with reduced capabilities, for example. The primary operator may advertise the available spectrum (e.g., a band), a time of availability, a minimum cost for licensing the available spectrum, and/or a location (e.g., geography) where exclusive access to the available spectrum may be allowed, etc. One or more other conditions may be added to advertising of the available spectrum, such as a list of allowable operators, a white list of operators, and/or black list of operators, etc.

The CDIS 1502 may be a node managed and/or controlled by the regulator. The CDIS 1502 may have access to government and/or regulator policies that may define how the licensed spectrum offered by the primary operator may be allowed to be re-allocated/shared. The CDIS 1502 may provide a regulator with a guarantee that such policies may be complied with when the bandwidth is leased to one or more other systems.

The CDIS 1502 may function as an LSA controller. At 3, the CDIS 1502 may check one or more regulator policies associated with the available spectrum, in order to determine one or more sharing rules that may be imposed on the available spectrum. For example, the CDIS 1502 may retrieve such information from the regulator policies and/or spectrum trading rules database 1504. An LSA implementation may assume, for example, that a regulator controls bandwidth sharing. The CDIS 1502 may include a regulatory entity and/or may be tied to one or more regulators. The CDIS 1502 may be configured to discover available spectrum that may offered for access by licensees. The CDIS 1502 may function to protect a primary operator (e.g., an incumbent), for example by making sure that use of licensed spectrum by the licensee does not result in interference to the primary incumbent. There may be a single CDIS per country, or multiple CDISs per country, or multiple countries using one CDIS with coordination, for example.

At 4, the availability of licensed spectrum, the sharing rules, a minimum access, and/or communication information from the primary operator (e.g., how to contact the primary operator) may be broadcast to one or more CMs 1508, for example by the CDIS 1502. The broadcast may be filtered, for example based on criteria and/or preference parameters supplied by one or more CMs 1508 that may be subscribers to the broadcasts. The broadcast may include a filtered list of CMs 1508 that the broadcast is directed to.

At 5, one or more CMs 1508 that received the broadcast and are interested in the available resource in the licensed spectrum may start a negotiation procedure with the primary operator to fix, for example, a final cost, an agreement, and/or sharing conditions. The one or more CMs 1508 may be interested in the available resource based on respective spectrum requests from associated CE networks managed by the one or more CMs 1508. The CMs 1508 may determine whether the available resource is suitable to fulfill the respective spectrum requests. In determining whether the available resource is suitable to fulfill a spectrum request, a CM 1508 may evaluate one or more characteristics of the available resource, for example a reliability of the available resource, a peak data rate that may be achieved using the available resource, etc.

The negotiation for access to the available resource may be token based, for example as described herein. For example, if the available resource is suitable to fulfill the respective spectrum requests received by one or more CMs 1508, the one or more CMs 1508 may submit bids for the available resource.

At 6, one or more CMs 1508 may add the available spectrum to a local operator coexistence database (e.g., a respective LSA database 1510). The spectrum may be pooled, in the coexistence database, with the TVWS spectrum or spectrum from one or more unlicensed bands. A separate database may be used for this purpose. A CM 1508 may allow the systems (e.g., CE networks) it is serving to use an aggregated pool of bandwidth. The aggregated pool of bandwidth may include unlicensed spectrum and spectrum that may be controlled under an LSA license implementation.

At 7, inter-CM communication may be used, for example to manage the sharing and/or the spectrum awarded by the primary operator, as described herein. For example, if multiple CMs 1508 are awarded a spectrum resource, inter-CM communication may be used, for example to determine how the spectrum resource may be shared between one or more operators.

Such a spectrum sharing or sub-licensing procedure may be initiated by a primary operator, for example. The spectrum sharing or sub-licensing procedure may be initiated by one or more CMs requesting additional spectrum to the CDIS. For example, a spectrum sharing or sub-licensing procedure may be triggered by a spectrum request from a CE. The CE may quantify an amount of desired bandwidth, for example based on current QoS needs. The required QoS to bandwidth may be translated in the CE and/or the CM.

A primary operator may communicate with a CDIS to indicate that the usage of some spectrum may be sub-licensed. The CDIS and/or the LSA controller may check one or more regulator policies associated with the available spectrum, for example to come up with sharing rules that may be imposed on that spectrum. When a CE requires additional bandwidth, the CE may send a spectrum request message to an associated CM, asking for more spectrum. The CM may check the CDIS for a list of neighbors that may include the primary operator with a licensed band for leasing. With a list of CMs (that may include the primary operator), the requesting CM may negotiate with the primary operator (and potentially one or more other CMs that may make a request at the same time) for leasing the band which the primary operator is willing to lease. Inter-CM communication may be used to manage the sharing or the spectrum awarded by the primary operator, as described herein.

The CDIS may provide contact information for one or more neighboring networks. An advanced CDIS may provide channel usage information. The advanced CDIS may facilitate leasing of available licensed spectrum. For example, a primary operator may communicate with a CDIS to indicate that the primary operator wishes to sell or lease the usage of some licensed spectrum to one or more licensees. The primary operator may advertise the available spectrum, a time of availability, a minimum cost for licensing the available spectrum, and/or a location (e.g., geography) where exclusive access may be allowed, etc. One or more other conditions may be imposed on leasing the available spectrum, such as a list of allowable operators, a white list of operators, and/or a black list of operators, etc. The CDIS may check one or more regulator policies associated with the available spectrum, for example in order to determine one or more sharing rules to be imposed on the available spectrum. The CDIS may update a TVWS usage information database accordingly, such that a CM may identify the available spectrum in a given location, for a certain time period, and/or a cost associated with leasing the spectrum. One or more advanced CDIS procedures, for example as described herein, may be applied by an LSA controller.

Figure 16:
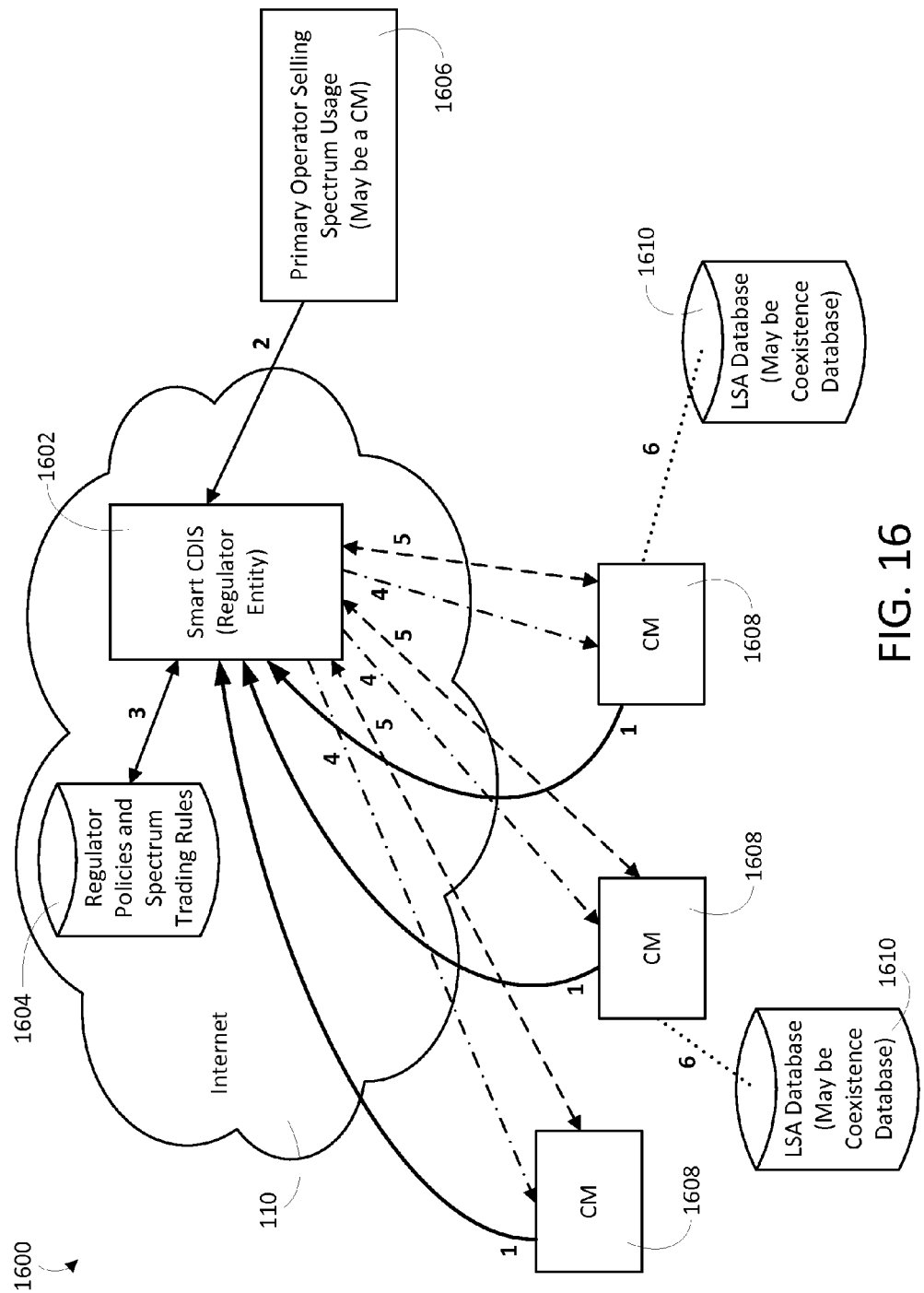
FIG. 16 illustrates an example architecture for LSA with a smart CDIS.

FIG. 16 illustrates an example architecture 1600 for LSA with a smart CDIS. The architecture 1600 may include a smart CDIS 1602 and a regulator policies and/or spectrum trading rules database 1604. The smart CDIS 1602 and/or the database 1604 may be located, for example, in the Internet 110. The architecture 1600 may include an operator node 1606 of a primary operator that may be selling usage of licensed spectrum. The operator node 1606 may be configured to operate as a CM, for example.

The architecture 1600 may include one or more CMs 1608 and one or more LSA databases 1610. One or more of the LSA databases 1610 may be configured as coexistence databases. Respective ones of the CMs 1608 and the LSA databases 1610 may be associated with the same or different carriers (e.g., network operators). As shown, the architecture 1600 may include first, second, and third CMs 1608, and first and second LSA databases 1610.

An example CM management service process using a smart CDIS is illustrated using the example architecture 1600. At 1, one or more CMs 1608 may apply to receive LSA broadcast messages from the smart CDIS 1602 that may be indicative of the availability of a resource in the licensed spectrum (e.g., the LSA spectrum). The CMs 1608 may apply to receive LSA broadcasts, for example, by transmitting a message to the smart CDIS 1602 that is indicative of a subscription to the broadcasts.

One or more of the CMs 1608 may apply to receive LSA broadcasts based on one or more criteria and/or preference parameters that may include, for example, a cost of an available resource, a frequency band of the available resource, restrictions imposed on the available resource (e.g., exclusive usage), a location where the band may be used, or the like. The smart CDIS 1602 may use such criteria to filter the broadcasts. The CMs 1608 may receive these filtered broadcasts from the smart CDIS 1602, for example based on the criteria.

At 2, the primary operator may communicate with the smart CDIS 1602, for example via the operator node 1606, to indicate that the primary operator wishes to sell and/or lease the usage of an available resource in the licensed spectrum to one or more licensees. The operator node 1606 may be configured as a CM, or as a CM with reduced capabilities, for example. The primary operator may advertise the available spectrum (e.g., a band), a time of availability, a minimum cost for licensing the available spectrum, and/or a location (e.g., geography) where exclusive access to the available spectrum may be allowed, etc. One or more other conditions may be added to advertising of the available spectrum, such as a list of allowable operators, a white list of operators, and/or black list of operators, etc.

At 3, the smart CDIS 1602 may check one or more regulator policies associated with the available spectrum, in order to determine one or more sharing rules that may be imposed on the available spectrum. For example, the smart CDIS 1602 may retrieve such information from the regulator policies and/or spectrum trading rules database 1604.

At 4, the availability of licensed spectrum, the sharing rules, a minimum access, and/or communication information from the primary operator (e.g., how to contact the primary operator) may be broadcast to one or more CMs 1608, for example by the smart CDIS 1602. The broadcast may be filtered, for example based on criteria and/or preference parameters supplied by one or more CMs 1608 that may be subscribers to the broadcasts. The broadcast may include a filtered list of CMs 1608 that the broadcast is directed to.

At 5, one or more CMs 1608 that received the broadcast and are interested in the available resource in the licensed spectrum may start a negotiation procedure to fix, for example, a final cost, an agreement, and/or sharing conditions. The negotiation procedure may be performed with the smart CDIS 1602, for example via direct communication between the one or more CMs 1608 and the smart CDIS. The one or more CMs 1608 may be interested in the available resource based on respective spectrum requests from associated CE networks. The CMs 1608 may determine whether the available resource is suitable to fulfill the respective spectrum requests. In determining whether the available resource is suitable to fulfill a spectrum request, a CM 1608 may evaluate one or more characteristics of the available resource, for example a reliability of the available resource, a peak data rate of the available resource, etc.

The negotiation for access to the available resource may be token based, for example as described herein. For example, if the available resource is suitable to fulfill the respective spectrum requests received by one or more CMs 1608, the one or more CMs 1608 may submit bids for the available resource. One or more smart CDIS procedures, for example as described herein, may be applied by an LSA controller. For example, the example smart CDIS procedure 900 illustrated in FIG. 9, and described herein, may be performed.

At 6, one or more CMs 1608 may add the available spectrum to a local operator coexistence database (e.g., a respective LSA database 1610). The spectrum may be pooled, in the coexistence database, with the TVWS spectrum or spectrum from one or more unlicensed bands. A separate database may be used for this purpose. A CM 1608 may allow the systems (e.g., CE networks) it is serving to use an aggregated pool of bandwidth. The aggregated pool of bandwidth may include unlicensed spectrum and spectrum that may be controlled under an LSA license implementation.

Such a spectrum sharing or sub-licensing procedure may be initiated by a primary operator. A spectrum sharing or sub-licensing procedure may be initiated by a CM that is requesting additional spectrum to the smart CDIS. For example, a spectrum sharing or sub-licensing procedure may be triggered by a spectrum request from a CE. A primary operator may communicate with a smart CDIS to indicate that the usage of some spectrum may be licensed. The smart CDIS and/or the LSA controller may check one or more regulator policies associated with the available spectrum, for example to come up with sharing rules that may be imposed on that spectrum. A CE may send a spectrum request message to an associated CM, asking for more spectrum. The CM may check the smart CDIS for the available spectrum at a certain location. The available spectrum may include one or more available resources (e.g., bands) provided by a primary operator that has one or more licensed bands available for leasing.

A primary operator may typically be the original band owner. However coexistence management service, for example as described herein, may be implemented for operators other than original band owners. For example, the licensed spectrum leasing processes described herein may be applied to band sub-licensing and/or sub-leasing.

A single CDIS may act as an agent for a primary operator, and may get rewards from the primary operator. Multiple CDIS instances may compete for an agent role. Competition amongst CDIS instances vying for the agent role may be based on a highest selling price for an available band from a primary operator, may be based on a least agent fee for the operation, and/or may be based on one or more auction-related processes.

Figure 17:
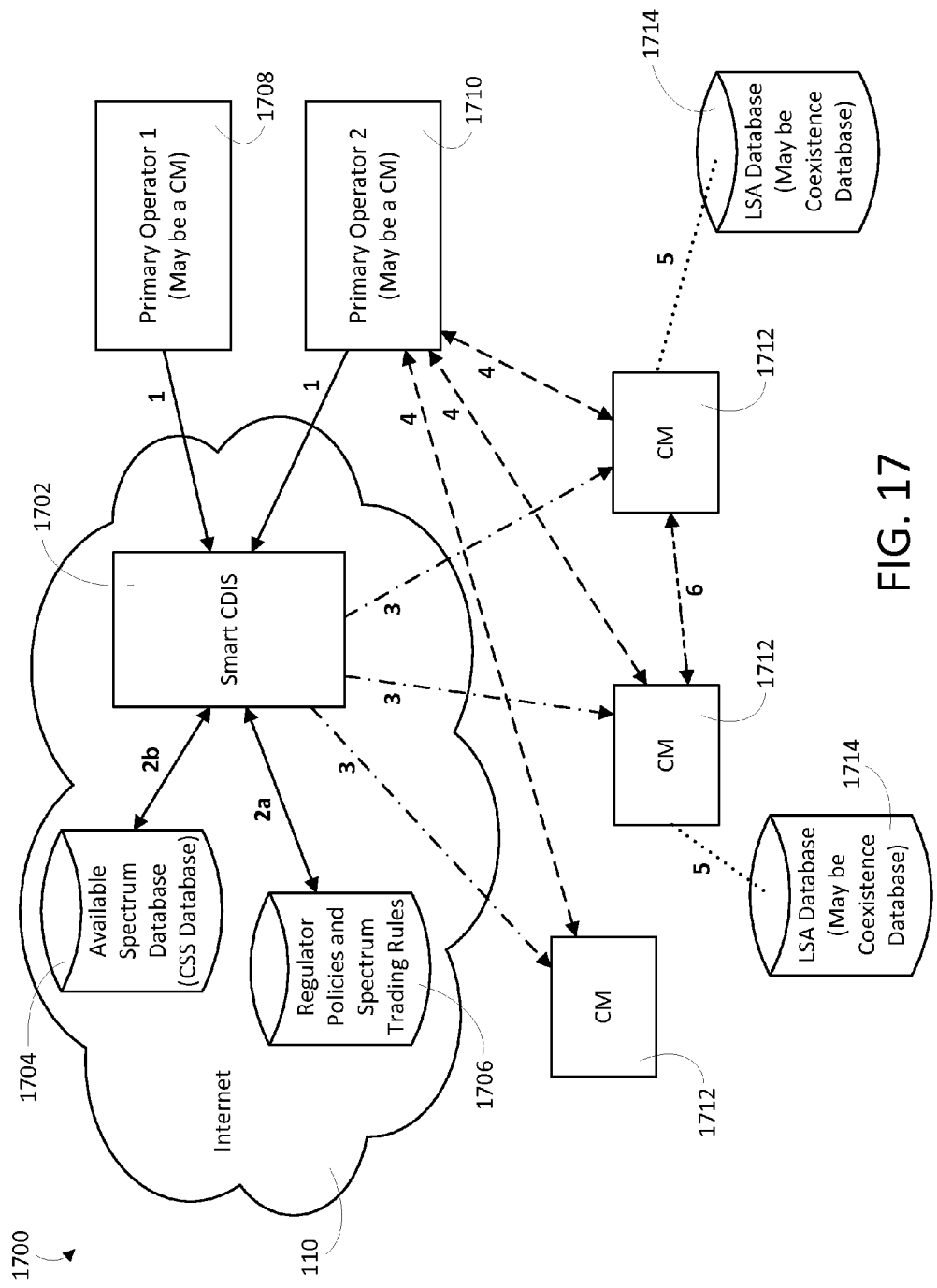
FIG. 17 illustrates an example architecture for cloud spectrum sharing (CSS) with a smart CDIS.

FIG. 17 illustrates an example architecture 1700 for cloud spectrum sharing (CSS) with a smart CDIS. The architecture 1700 may include a smart CDIS 1702, an available spectrum database (CSS database) 1704, and a regulator policies and/or spectrum trading rules database 1706. The smart CDIS 1702, the CSS database 1704, and/or the database 1706 may be located, for example, in the Internet 110. The architecture 1700 may include a first operator node 1708 associated with a first primary operator that may be selling usage of licensed spectrum and a second operator node 1710 associated with a second primary operator that may be selling usage of licensed spectrum.

The architecture 1700 may include one or more CMs 1712 and one or more LSA databases 1714. One or more of the LSA databases 1714 may be configured as coexistence databases. Respective ones of the CMs 1712 and the LSA databases 1714 may be associated with the same or different carriers (e.g., network operators). As shown, the architecture 1700 may include first, second, and third CMs 1712, and first and second LSA databases 1714.

An example CM management service process, using a smart CDIS, for CSS is illustrated using the example architecture 1700. One or more CMs 1712 may apply to receive LSA broadcast messages from the smart CDIS 1702 that may be indicative of the availability of a resource in the licensed spectrum (e.g., the LSA spectrum). The CMs 1712 may apply to receive LSA broadcasts, for example, by transmitting a message to the smart CDIS 1702 that is indicative of a subscription to the broadcasts.

One or more of the CMs 1712 may apply to receive LSA broadcasts based on one or more criteria and/or preference parameters that may include, for example, a cost of an available resource, a frequency band of the available resource, restrictions imposed on the available resource (e.g., exclusive usage), a location where the band may be used, or the like. The smart CDIS 1702 may use such criteria to filter the broadcasts. The CMs 1712 may receive these filtered broadcasts from the smart CDIS 1702, for example based on the criteria.

At 1, the first and/or second primary operators may communicate with the smart CDIS 1702, for example via the first and second operator nodes 1708, 1710, respectively, to indicate that one or both of the first and second primary operators wish to sell and/or lease the usage of one or more available resources in the licensed spectrum to one or more licensees.

The first and second operator nodes 1708, 1710, respectively, may be configured as CMs, or as CMs with reduced capabilities, for example. The first and/or second primary operators may advertise available spectrum (e.g., one or more bands), a time of availability, a minimum cost for licensing the available spectrum, and/or a location (e.g., geography) where exclusive access to the available spectrum may be allowed, etc. One or more other conditions may be added to advertising of the available spectrum, such as a list of allowable operators, a white list of operators, and/or black list of operators, etc.

In the example CSS spectrum 1700, spectrum requests and/or instances of new available spectrum from the first and/or second primary operators may be more dynamic, for example in comparison to the example LSA architectures 1500 and 1600, and may be handled more dynamically than in the case of LSA. For example, new spectrum may become available to the smart CDIS 1702 on a short timeframe, and the smart CDIS 1702 may act as a broker of the spectrum. The smart CDIS 1702 may maintain information on which CMs 1712 have made requests for bandwidth that may match the frequency band, cost, etc. of newly available frequencies.

At 2b, the smart CDIS 1702 may maintain a database, for example the CSS database 1704, that may store the available spectrum and/or information about the spectrum, such as applicable sharing rules, a location of availability, a cost, and/or a primary operator to be paid, etc. The smart CDIS 1702 may pool available bandwidth from different operators, for example the first and second operators, and may determine which operator CMs 1712 should pay which primary operator how much, for example based on the spectrum that was allocated to each CM 1712. The smart CDIS 1702 be configured to determine spectrum availability for a given time, location, and/or bandwidth, for example, based on information in such a database.

At 2a, the smart CDIS 1702 may check one or more regulator policies associated with the available spectrum, in order to determine one or more sharing rules that may be imposed on the available spectrum. For example, the smart CDIS 1702 may retrieve such information from the regulator policies and/or spectrum trading rules database 1706.

At 3, one or more CMs 1712 may be informed of corresponding changes of allocated bandwidth by the smart CDIS 1702. The CMs 1712 may propagate allocated bandwidth changes down to the respective CE level. The negotiation and/or messaging described herein may apply to sharing of the allocated bandwidth by the CMs, for example in inter-CM communication, and/or in communication with the smart CDIS 1702.

The availability of licensed spectrum, the sharing rules, a minimum access, and/or communication information from the primary operator (e.g., how to contact a respective one of the first or second primary operators) may be broadcast to one or more CMs 1712, for example by the smart CDIS 1702. The broadcast may be filtered, for example based on criteria and/or preference parameters supplied by one or more CMs 1712 that may be subscribers to the broadcasts. The broadcast may include a filtered list of CMs 1712 that the broadcast is directed to.

At 4, one or more CMs 1712 that received the broadcast and are interested in the available resource in the available licensed spectrum may start a negotiation procedure with one or more of the first and second primary operators to fix, for example, a final cost, an agreement, and/or sharing conditions. The one or more CMs 1712 may be interested in the available resource based on respective spectrum requests from associated CE networks. The CMs 1712 may determine whether the available resource is suitable to fulfill the respective spectrum requests. In determining whether the available resource is suitable to fulfill a spectrum request, a CM 1712 may evaluate one or more characteristics of the available resource, for example a reliability of the available resource, a peak data rate of the available resource, etc.

The negotiation for access to the available resource may be token based, for example as described herein. For example, if the available resource is suitable to fulfill the respective spectrum requests received by one or more CMs 1712, the one or more CMs 1712 may submit bids for the available resource. One or more smart CDIS procedures, for example as described herein, may be applied by an LSA controller. For example, the example smart CDIS procedure 900 illustrated in FIG. 9, and described herein, may be performed.

At 5, one or more CMs 1712 may add the available spectrum to a local operator coexistence database (e.g., a respective LSA database 1714). The spectrum may be pooled, in the coexistence database, with the TVWS spectrum or spectrum from one or more unlicensed bands. A separate database may be used for this purpose. A CM 1712 may allow the systems (e.g., CE networks) it is serving to use an aggregated pool of bandwidth. The aggregated pool of bandwidth may include unlicensed spectrum and spectrum that may be controlled under an LSA license implementation. At 6, inter-CM communication may be used, for example to manage the sharing and/or the spectrum awarded by one or both of the first and second primary operators, as described herein.

Although features and elements are described above in particular combinations, one of ordinary skill in the art will appreciate that each feature or element can be used alone or in any combination with the other program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method of allocating licensed spectrum, the method comprising:
   receiving a broadcast that is indicative of an available resource in the licensed spectrum;
   receiving a request for access to the licensed spectrum;
   determining whether the available resource is suitable to fulfill the request; and
   if the available resource is suitable to fulfill the request, submitting a bid for the available resource.

2. The method of claim 1, further comprising adding information associated with the available resource to a coexistence database.

3. The method of claim 2, wherein the available resource in the licensed spectrum is combined, in the coexistence database, with a second resource in an unlicensed spectrum, to create a pool of available resources.

4. The method of claim 1, wherein determining whether the available resource is suitable to fulfill the request includes evaluating at least one of a reliability of the available resource, a time availability of the available resource, or a peak data rate that can be achieved on the available resource.

5. The method of claim 1, wherein submitting a bid for the available resource includes sending an indication of a number of tokens to a network device that is competing for access to the available resource.

6. The method of claim 1, wherein submitting a bid for the available resource includes sending an indication of a number of tokens to a network device that is responsible for granting access to the available resource.

7. The method of claim 1, further comprising, upon receiving an indication that the bid was successful, assigning the resource to an originator of the request.

8. The method of claim 1, further comprising, upon expiration a pre-determined delay period, assigning the resource to an originator of the request.

9. The method of claim 1, further comprising transmitting a message that is indicative of a subscription to the broadcast.

10. The method of claim 9, wherein the message includes a criterion associated with a desired characteristic of the available resource.

11. A network device configured to:
receive a broadcast that is indicative of the availability of a resource in a licensed spectrum;
receive a request for access to the licensed spectrum;
determine whether the available resource is suitable to fulfill the request; and
if the available resource is suitable to fulfill the request, submit a bid for the available resource.

12. The network device of claim 11, further configured to add information associated with the available resource to a coexistence database.

13. The network device of claim 12, wherein the available resource in the licensed spectrum is combined, in the coexistence database, with a second resource in an unlicensed spectrum, to create a pool of available resources.

14. The network device of claim 11, wherein the network device determines whether the available resource is suitable to fulfill the request by evaluating at least one of a reliability of the available resource, a time availability of the available resource, or a peak data rate that can be achieved on the available resource.

15. The network device of claim 11, wherein the network device submits a bid for the available resource by sending an indication of a number of tokens to a second network device that is competing for access to the available resource.

16. The network device of claim 11, wherein the network device submits a bid for the available resource by sending an indication of a number of tokens to a controller that is responsible for granting access to the available resource.

17. The network device of claim 11, further configured to, upon receiving an indication that the bid was successful, assign the resource to an originator of the request.

18. The network device of claim 11, further configured to, upon expiration a pre-determined delay period, assign the resource to an originator of the request.

19. The network device of claim 11, further configured to transmit a message that is indicative of a subscription to the broadcast.

20. The network device of claim 19, wherein the message includes a criterion associated with a desired characteristic of the available resource.

* * * * *